US007508961B2

(12) United States Patent
Chen et al.

(10) Patent No.: US 7,508,961 B2
(45) Date of Patent: Mar. 24, 2009

(54) METHOD AND SYSTEM FOR FACE DETECTION IN DIGITAL IMAGES

(75) Inventors: Shoupu Chen, Rochester, NY (US); Henry Nicponski, Albion, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 643 days.

(21) Appl. No.: 10/387,079

(22) Filed: Mar. 12, 2003

(65) Prior Publication Data

US 2004/0179719 A1 Sep. 16, 2004

(51) Int. Cl.
*G06K 9/00* (2006.01)
(52) U.S. Cl. .................. 382/118; 382/224; 382/227
(58) Field of Classification Search ................ 382/118, 382/224–227
See application file for complete search history.

(56) References Cited

U.S. PATENT DOCUMENTS

| | | | | |
|---|---|---|---|---|
| 5,058,182 | A * | 10/1991 | Kuan et al. ................. | 382/202 |
| 5,430,809 | A | 7/1995 | Tomitaka ..................... | 382/173 |
| 5,629,752 | A | 5/1997 | Kinjo .......................... | 355/35 |
| 5,835,616 | A | 11/1998 | Lobo et al. .................. | 382/118 |
| 6,337,927 | B1 * | 1/2002 | Elad et al. ................... | 382/225 |
| 6,421,463 | B1 * | 7/2002 | Poggio et al. ............... | 382/224 |
| 6,885,760 | B2 * | 4/2005 | Yamada et al. .............. | 382/118 |
| 7,035,447 | B2 * | 4/2006 | Take ............................ | 382/145 |
| 7,050,927 | B2 * | 5/2006 | Sinclair et al. .............. | 702/150 |
| 2004/0066966 | A1 * | 4/2004 | Schneiderman ............. | 382/159 |

OTHER PUBLICATIONS

Siddiqui; "Distributed Knowledge-Based Spectral Processing and Classification System for Instruction and Learning", SPIE Conference on Pattern Recognition, Chemometrics, and Imaging for Optical Environmental Monitoring, Sep. 1999.*

Yang et al.; "Detecting Faces in Imgaes: A Survey", IEEE Transactions on Pattern Analysis and Machine Intelligence, vol. 24, No. 1, Jan. 2002.*

Liu, Z; Wang, Y; "Face Detection and Tracking in Video Using Dynamic Program", International Conference on Image Processing, vol. 1, p. 53-56, 2000.*

U.S. Appl. No. 10/211,011, filed Aug. 2, 2002, Shoupu Chen et al.

"Human Face Detection in a Complex Background" by Guangzheng Yang and Thomas S. Huang. *Pattern Recognition*, vol. 1, pp. 53-63, 1994.

"Robust Real-time Object Detection" by Paul Viola and Michael Jones. *Proc. Second International Workshop on Statistical and Computation Theories of Vision—Modeling, Learning, Computing, and Sampling*, Vancouver, 2001.

"The Statistical Analysis of Time Series" by T.W. Anderson, Chapter 6, John Wiley & Sons, 1994.

"A Decision-Theoretic Generalization of On-line Learning and an Application to Boosting" by Yoav Freund and Robert Schapire. *Journal of Computer and System Sciences*, 55(1), pp. 119-139.

"A Statistical Approach to 3D Object Detection Applied to Faces and Cars" by Henry Schneiderman. Proc. CVPR 2000.

\* cited by examiner

*Primary Examiner*—John B Strege
(74) *Attorney, Agent, or Firm*—David M. Woods

(57) ABSTRACT

A digital image processing method for detecting faces in a digital color image comprises the steps of: providing a distributed face detection system having complementary classifiers, wherein the classifiers are complementary in a frequency domain; selecting classifier parameters for the complementary classifiers from a plurality of different parameter generating sources, at least one of which is controllable by human input; reconfiguring the complementary classifiers in the distributed face detection system according to the selected classifier parameters; and detecting faces using the distributed face detection system.

20 Claims, 22 Drawing Sheets

METHOD AND SYSTEM FOR FACE DETECTION IN DIGITAL IMAGES

CROSS-REFERENCE TO RELATED APPLICATION(S)

Reference is made to commonly assigned copending application Ser. No. 10/211,011, entitled "Method for Locating Faces in Digital Color Images" and filed 2 Aug. 2002 in the names of Shoupu Chen and Lawrence A. Ray, and which is assigned to the assignee of this application.

FIELD OF THE INVENTION

The present invention relates to digital image processing methods for automatically locating human faces in digital images.

BACKGROUND OF THE INVENTION

In digital image processing and, in particular, image processing for the purpose of enhancing and optimizing the process of images capture by a camera, it is often useful to automatically detect human faces. Applications of face detection include face recognition, image beautification, image scene balancing, image retrieval, security surveillance and person identification.

A preponderance of images collected by photographers contain human facial images, which are often the most important subjects of the images. Knowledge of the presence and location of faces in an image, and especially the presence and location of the faces, could enable many beneficial improvements to be made in the image capture process. Some are suggested in the prior art. For example, automatic and semi-automatic focusing cameras often pick a portion of the scene on which to adjust for best focus. If the camera could locate the faces in a scene, then focus could be optimized for the faces unless the photographer explicitly overrides that choice. In U.S. Pat. No. 5,835,616, a face detection system is used in automated photography to eliminate manual adjustment problems that can result in poor quality from lack of focused subjects.

Furthermore, detection of the faces in a scene gives very strong evidence of the proper location of the principal subject matter. In that connection, the process disclosed in the '616 patent automatically finds a human face in a digitized image taken by a digital camera, confirms the existence of the face by examining facial features and then has the camera automatically center itself on the detected face. Detection of a face also yields strong evidence of proper color balance for the facial and/or skin area. For example, in U.S. Pat. No. 5,430,809 a video camera autonomously tracks a facial target in order to set a measuring frame on the facial object for purpose of auto exposure and auto focus. In addition, once the measuring frame is set, an auto white balance system adjusts colors to obtain optimal skin color on the face. As a result, the auto white balance system is said to perform auto skin color balance. It is also known (from U.S. Pat. No. 5,629,752) to detect a human face and then to utilize data representing color and/or density of the facial region to determine an exposure amount such that the region corresponding to the face can be printed appropriately by a photographic printer.

A great amount of research effort has been spent on proposing a wide variety of face detection techniques. Face detection is defined as locating the existence of a face in an image. Face recognition on the other hand is defined as assigning an identity to a detected face. Face detection is often a precursor to face recognition. In general, prior art face detection techniques can be classified as either feature-based or region-based. The techniques in the feature-based category first derive low level features such as edges and then use face knowledge-based analysis to find face candidates in an image. The apparent properties of the face such as skin color and face geometry are exploited at different system levels in this category. Feature-based approaches have dominated the face detection research interest for a quite long period before the recent shift of interest to using pattern recognition theory in face detection. It is worth noting that the main components used in the feature-based techniques are edges that come from a high frequency portion of the image and, in general, are not as stable as components from the low frequency portion. Also, in using skin color for face detection, most techniques employ carefully designed skin color models in order to achieve high skin detection accuracy with very low false positives. However, skin color models having a high degree of accuracy often tend to exclude skin colors falling out side of the majority skin color region upon which skin color models are built. The exclusion of non-majority skin colors, in turn, results in face detection failures.

In recent years, benefiting from the advances in pattern recognition theory, techniques in the region-based category treat face detection as a pattern recognition problem without the application of face knowledge. The performance of the methods in this category solely relies on the quality of a classifier trained by learning examples from face class and non-face class training images. The number of samples of face and non-face (or the variation of training images) used in the training process largely determines the effectiveness of the classifier. More training images result in better classifiers. It is a commonly accepted understanding that, while the number of face training images may have a limit, the number of non-face training images has no limits. Thus, repeated training is not uncommon for techniques in this category. Huge footprints (memory spaces required to store trained classifier information in a computer to do the face detection task) may result, which may become a problem for applications with limited computing resources. It should also be noted that face structural (geometry) information is basically not used in techniques in this category.

While face detection has been studied over the past several years in relation to the subject of image understanding, it remains an area with impressive computational requirements, particularly if a robust face detection algorithm is needed. A number of methods have been devised that show reasonable performance over a range of imaging conditions. For example, in a recent article, Human Face Detection in A Complex Background, published in *Pattern Recognition*, Vol. 1, pp. 53-63, 1994, Guangzheng Yang and Thomas S. Huang proposed a hierarchical knowledge-based method to locate human faces in an image. Their method showed some promising results. However, the method presented a slow execution speed. The challenge is to devise face detection systems that produce acceptable detection accuracy with low computational cost (rapid execution). If this can be done successfully, the detection of faces in a scene will then serve as a springboard to numerous other improvements in the image capture process. In addition, it would be useful to detect faces in order to implement downstream activities after image capture, e.g., face detection could provide evidence of up/down orientation for subsequent printing (for example, of index prints).

It is now well understood that building an automatic face detection system is an very challenging problem due to the fact that there are practically unlimited variations in appearance of human faces in terms of color, posture, size, brightness, and texture, among others. Each of the existing face detection system designs could only accommodate a very small as well as different portion of the variations of face appearance in the ever increasing number of photographic images for various applications. Moreover, for a particular face detection algorithm, high execution speed and high detection accuracy usually do not have a common ground.

There is a need therefore for an improved face detection method that overcomes the problems set forth above.

SUMMARY OF THE INVENTION

The present invention is directed to overcoming one or more of the problems set forth above. Briefly summarized, according to one aspect of the present invention, the invention resides in a digital image processing method for detecting faces in a digital color image comprising the steps of: providing a distributed face detection system having complementary classifiers, wherein the classifiers are complementary in a frequency domain; selecting classifier parameters for the complementary classifiers from a plurality of different parameter generating sources, at least one of which is controllable by human input; reconfiguring the complementary classifiers in the distributed face detection system according to the selected classifier parameters; and detecting faces using the distributed face detection system.

In another aspect, the invention comprises digital image processing system for detecting faces in a digital color image comprising: a distributed face detection system having complementary classifiers, wherein the classifiers are complementary in a frequency domain; a plurality of different parameter generating sources for selecting classifier parameters for the complementary classifiers, wherein at least one of the sources is controllable by human input; and means for reconfiguring the complementary classifiers in the distributed face detection system according to the selected classifier parameters in order to detect faces using the distributed face detection system.

The present invention has the advantages of rapid execution, high detection accuracy, and flexibility.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
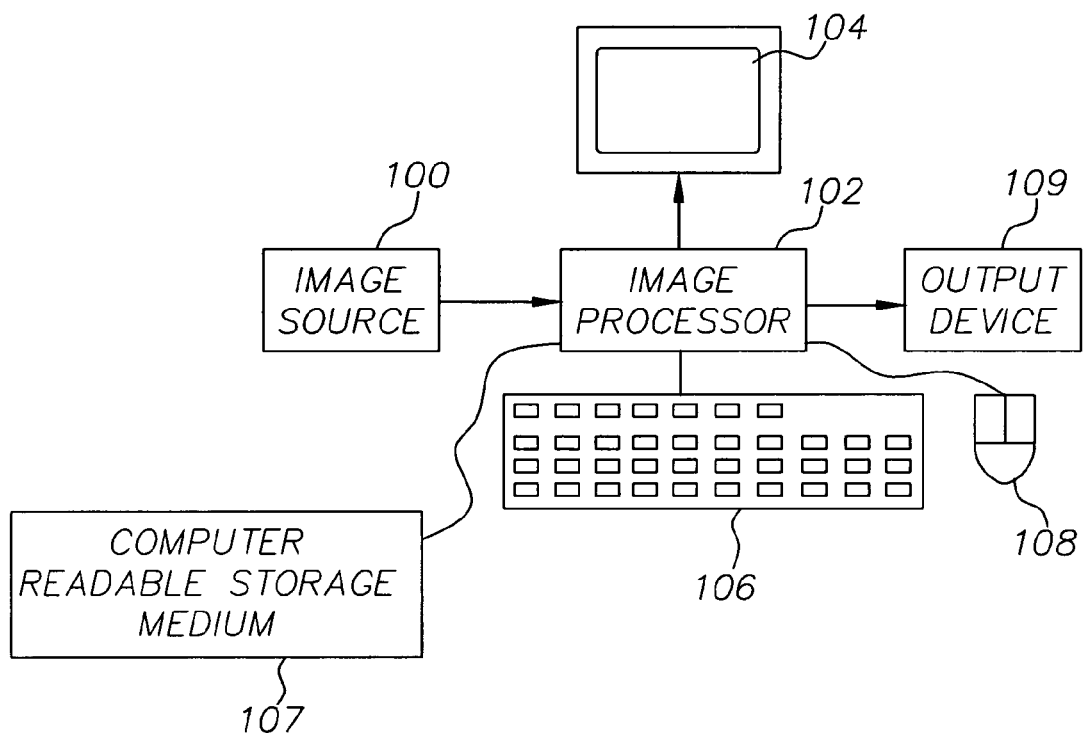
FIG. 1 is a schematic diagram of an image processing system useful in practicing the present invention.

FIG. 1 shows an image processing system useful in practicing the present invention, including a color digital image source 100, such as a film scanner, a digital camera, or a digital image storage device such as a compact disk drive with a Picture CD. The digital image from the digital image source 100 is provided to an image processor 102, such as a programmable personal computer, or a digital image processing work station such as a Sun Sparc workstation. The image processor 102 may be connected to a CRT display 104, an operator interface such as a keyboard 106 and a mouse 108. The image processor 102 is also connected to a computer readable storage medium 107. The image processor 102 transmits processed digital images to an output device 109. The output device 109 can comprise a hard copy printer, a long-term image storage device, a connection to another processor, or an image telecommunication device connected, for example, to the Internet.

In the following description, a preferred embodiment of the present invention will be described as a method. However, in another preferred embodiment, the present invention comprises a computer program product for detecting human faces in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. For example, the method of the present invention can be executed in the computer contained in a digital camera. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware.

Figure 2A:
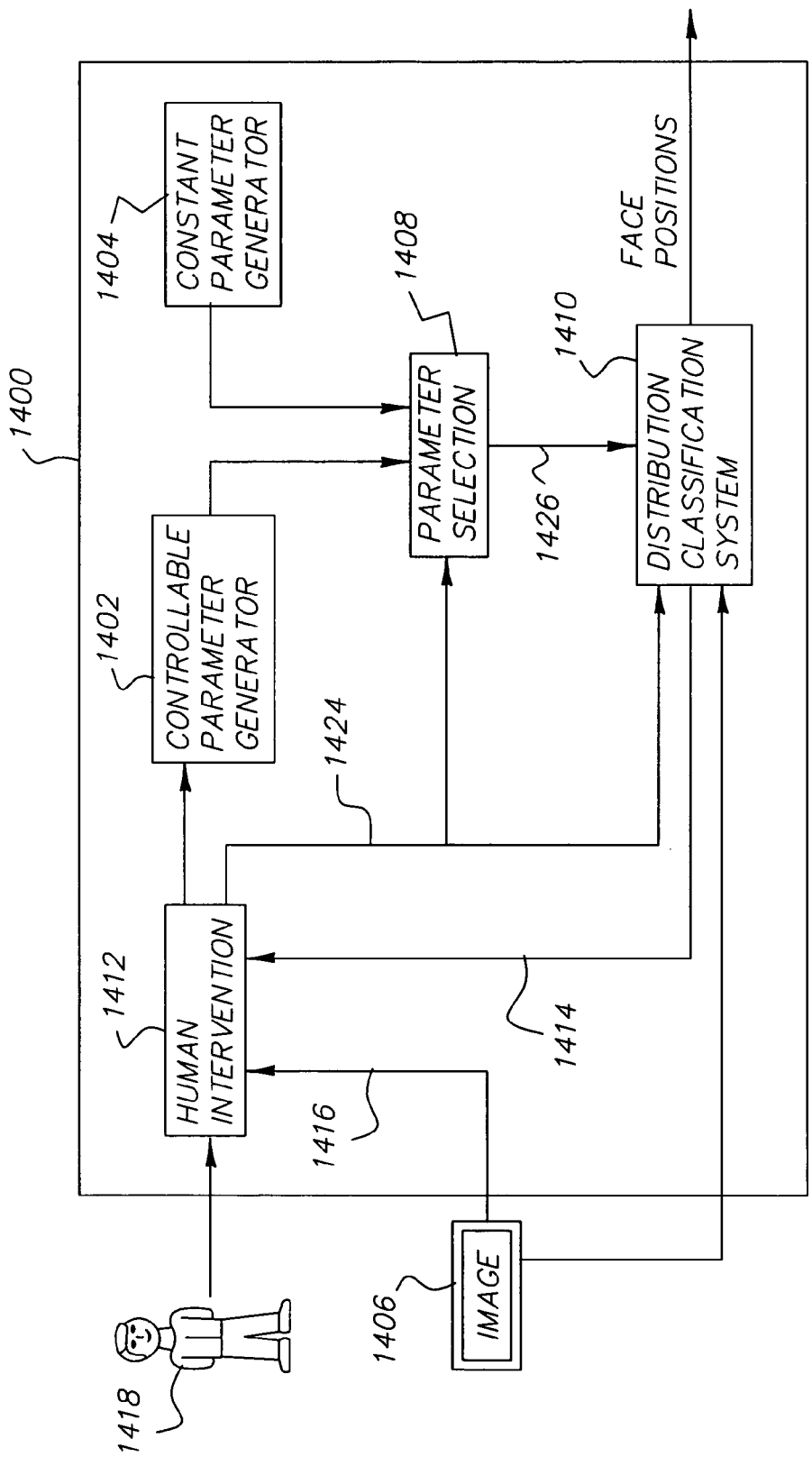
FIG. 2A is a flowchart illustrating the face detection method of the present invention.

Turning now to FIG. 2A, the method of the present invention will be outlined. FIG. 2A is a flow chart illustrating one embodiment of the face detection method of the present invention.

As stated in the background of the invention there are practically unlimited variations in appearance of human faces in terms of color, posture, size, brightness, and texture, among others. A particular face detection algorithm could adequately deal with only a very small portion of the variations of face appearance or meet certain execution requirements such as detection speed or detection accuracy.

Therefore, it is more desirable, as one measure, to synergistically integrate human and computer in the process of face detection for a practical image processing system. It is well known that a human excels in creativity, use of heuristics, flexibility and common sense; while a computer excels in speed of computation, strength and perseverance. This synergy of human and computer can be realized by incorporating a detection parameter control into the process. In FIG. 2A, there is provided a step of parameter selection 1408 letting the human operator participate in the process loop. The parameter selection 1408 selects a set of parameters either from a constant parameter generator 1404 or from a controllable parameter generator 1402. The controllable parameter generator 1402 is manipulated by a human operator 1418 through a step of human intervention 1412. The human operator 1418 receives input information 1406 or feedback 1414 from the detection output and makes a decision to use parameters either from the constant parameter generator 1404 or from the controllable parameter generator 1402.

Another measure provided by the present invention for building a practical face detection system provides an integrated solution to the face detection problem by constructing a distributed classification system with complementary classifiers. This distributed system can be reconfigured by commands from the human operator 1418 through a command line 1424.

Figure 14:
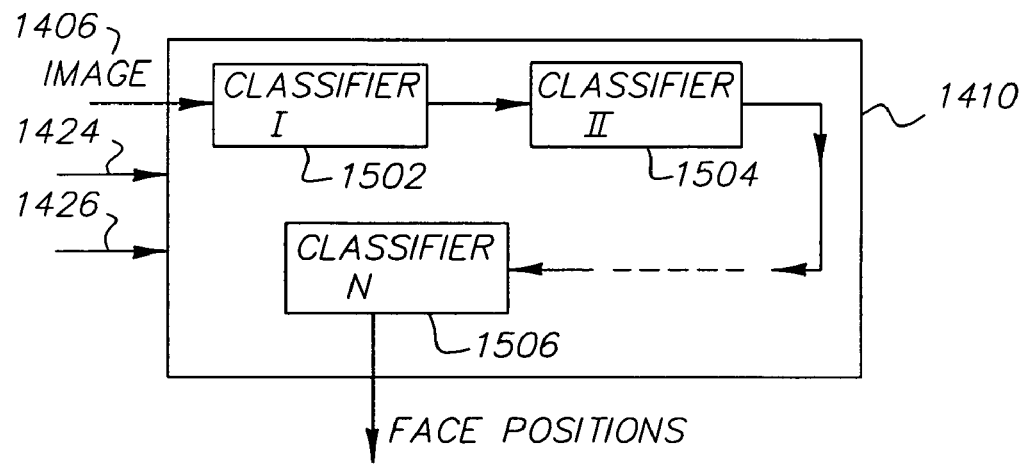
FIG. 14 is an illustration of an exemplary distributed face detection system in accordance with the invention.

An exemplary distributed classification system 1410, as depicted in FIG. 14, has N individual classifiers each of which is specialized in combating one or more specific problems. For instance, in FIG. 14, classifier I (1502) could be trained to deal with rotated faces illuminated with wide spectrum lights; classifier II (1504) could be trained to detect profile faces illuminated by narrow spectrum lights; classifier N (1506) may be capable of classifying large faces in black/white photos; and so on. This distributed system can be reconfigured by commands from the human operator 1418 through a command line 1424 to individual classifiers. For example, the system can be reconfigured so that M out of N classifiers are involved in the face detection process. M is equal to or less than N. Also, these classifiers could be arranged in serial or in parallel.

The distributed system 1410 can also be organized mainly with respect to feature information in terms of frequency properties. Different classifiers can be specialized in different partition(s) of the entire frequency spectrum for achieving best performance. The distributed system 1410 can also be organized mainly with respect to operation performance in terms of speed and detection accuracy. The distributed system 1410 can also be organized as a combination of aforementioned methods of classifier organization.

Figure 15:
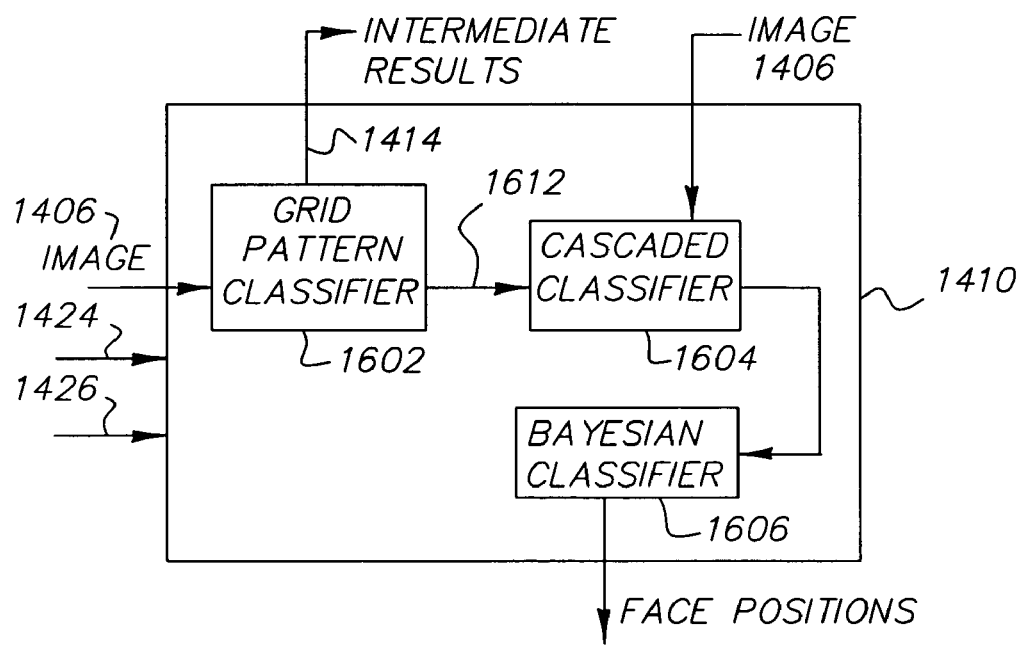
FIG. 15 is an illustration of another exemplary distributed face detection system in accordance with the invention.

FIG. 15 presents an exemplary structure of such a combination system that is used in the present invention. In this exemplary system, a grid pattern classifier 1602 (see the cross-referenced U.S. patent application Ser. No. 10/211,011 in the names of Shoupu Chen and Lawrence A. Ray, which is incorporated herein by reference) is used to rapidly weed out non-face regions in an image and deliver a handful of face candidate windows to a subsequent classifier. The main feature of the grid pattern classifier 1602 is that it operates at a very high speed while maintaining modest detection accuracy that translates to high true positives and relatively high false positives. The grid pattern classifier 1602 is followed by a cascaded classifier 1604 in this exemplary system. The cascaded classifier 1604 works only on the set of face candidate windows generated by the grid pattern classifier 1602. The cascaded classifier 1604 is responsible for delivering a set of face candidate windows with many fewer false positives to a final Bayesian Classifier 1606 for further verification. The Bayesian classifier 1606 is capable of achieving high detection accuracy but requires much more computing power (slow execution speed). Because the Bayesian classifier 1606 receives a tiny number of face candidates for verification, speed is of a lesser concern. With this structure, the overall system achieves high operating speed and relatively high detection accuracy. This distributed system can be reconfigured by commands from the human operator 1418 through a command line 1424. An exemplary alternative configuration could be a system containing the cascaded classifier 1604 and the Bayesian classifier 1606. Image 1402 will be input to the cascaded classifier 1604 directly. Face candidates output from the cascaded classifier 1604 are further processed by the Bayesian classifier 1606. Another exemplary configuration could be a system containing only the Bayesian classifier 1606. Image 1406 is processed by the Bayesian classifier 1606 which produces very highly accurate results. So, this reconfiguration mechanism provides a great flexibility for different applications.

It will be clear later that the grid pattern classifier basically uses information at the lower end of the frequency spectrum, while the cascaded and the Bayesian classifiers use information at the higher end information of the frequency spectrum.

Next, we first introduce the components of the distributed classifier system, and then we discuss the parameter selection.

1. Grid Pattern Classifier

Figure 2B:
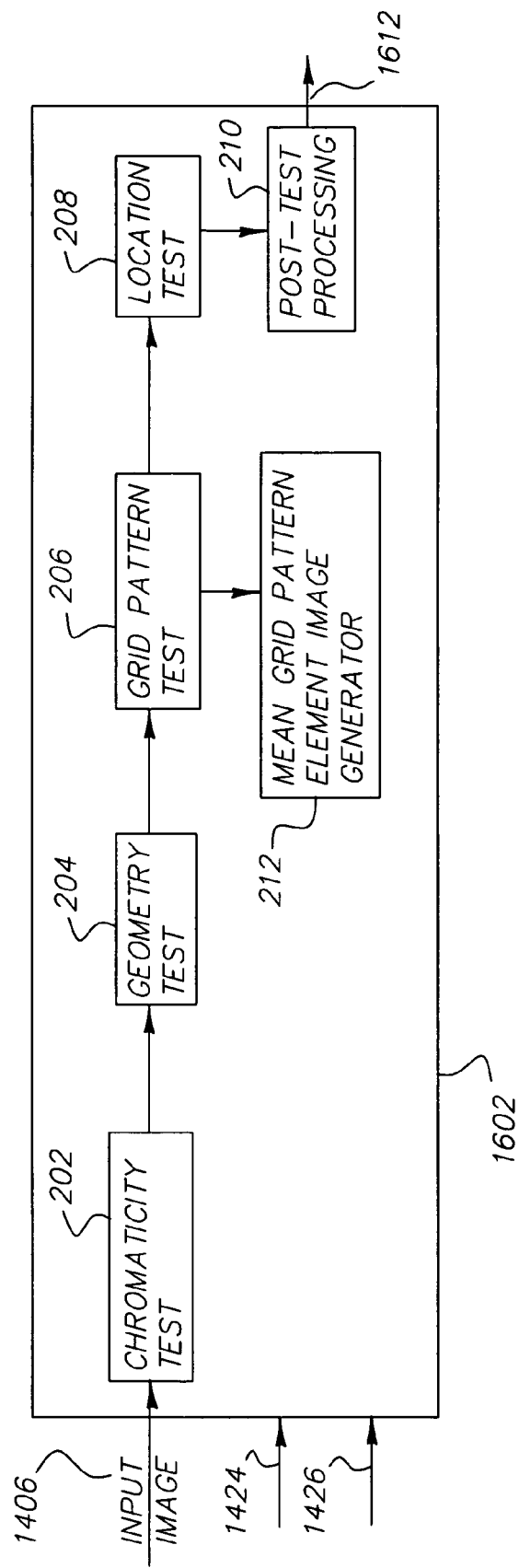
FIG. 2B is a flowchart illustrating a method of grid pattern classification.

Turning now to FIG. 2B, the method of the grid pattern classifier 1602 of the present invention will be outlined. In the embodiment shown in FIG. 2B, an input color digital image goes through a set of cascaded tests. Each these tests discards non-face objects with high confidence and retains most faces. The idea is to maintain a very high true-positive detection rate in every cascaded test while keeping a relatively low false-positive rate for individual tests. Since tests are cascaded, an overall performance of high true-positive and low false-positive rates is achieved. In the present invention, face detection tasks are distributed to different types of tests. This distributed system approach reduces the burden on each individual test, thereby, speeding up the detection process.

In the embodiment shown in FIG. 2B, there are basically four cascaded tests. A chromaticity test 202 discards, with high confidence, non-skin-color pixels in the input digital color image. This chromaticity test is different from the traditional skin color detection methods. In using a color property for face detection, existing skin color detection techniques employ carefully designed skin color models in order to achieve high skin detection accuracy with very low false positives. However, skin color models having a high degree of accuracy often tend to exclude skin colors falling outside of the skin color region of a majority population upon which skin color models are built. The exclusion of non-majority skin colors, in turn, results in face detection failures. This chromaticity test, instead, focuses on exclusion of non-skin-colors with high accuracy. For example, it discards (sets to black) saturated green, or saturated blue pixels, and keeps pixels having colors close to skin-colors of all hues. Therefore, it does not reject skin color pixels of non-majority populations.

The chromaticity test 202 is followed by a geometry test 204. Pixels retained in the chromaticity test 202 are grouped into regions (or clusters of pixels). These regions are checked to see if they pass a geometry test 204. The geometry test 204 basically checks a region's geometry shape, size, and location. Only those regions that pass the test will be allowed to enter a subsequent statistical test, that is, a grid pattern test 206. All pixels in regions that fail the test are set to black.

After the first two tests (chromaticity test 202 and geometry test 204), regions (or clusters of pixels) possibly containing faces remain and are further checked to locate actual positions of faces. The grid pattern test 206 performs the task of locating actual faces with the help of a mean grid pattern element image that is formed in a mean grid pattern element image generator 212. The grid pattern test 206 performs a similarity check by evaluating a correlation coefficient between the mean grid pattern element image and a grid pattern element image converted from a sub-image that is cropped from the remaining regions obtained from the geometry test 204. Sub-images that pass the grid pattern test are marked as candidate faces. Some candidates may reside partially in regions discarded in the geometry test 204.

All candidates are subsequently checked in a location test 208. Candidates residing partially in regions discarded in the geometry test 204 are unmarked in the location test 208. The grid pattern test 206 is performed on the image in a raster scan fashion. With the raster scanning, it may result in multiple candidates very close to each other in terms of position for the same face. Post-test processing 210 is then performed to combine closely spaced multiple candidates into a single candidate based on a distance measure.

Figure 4A:
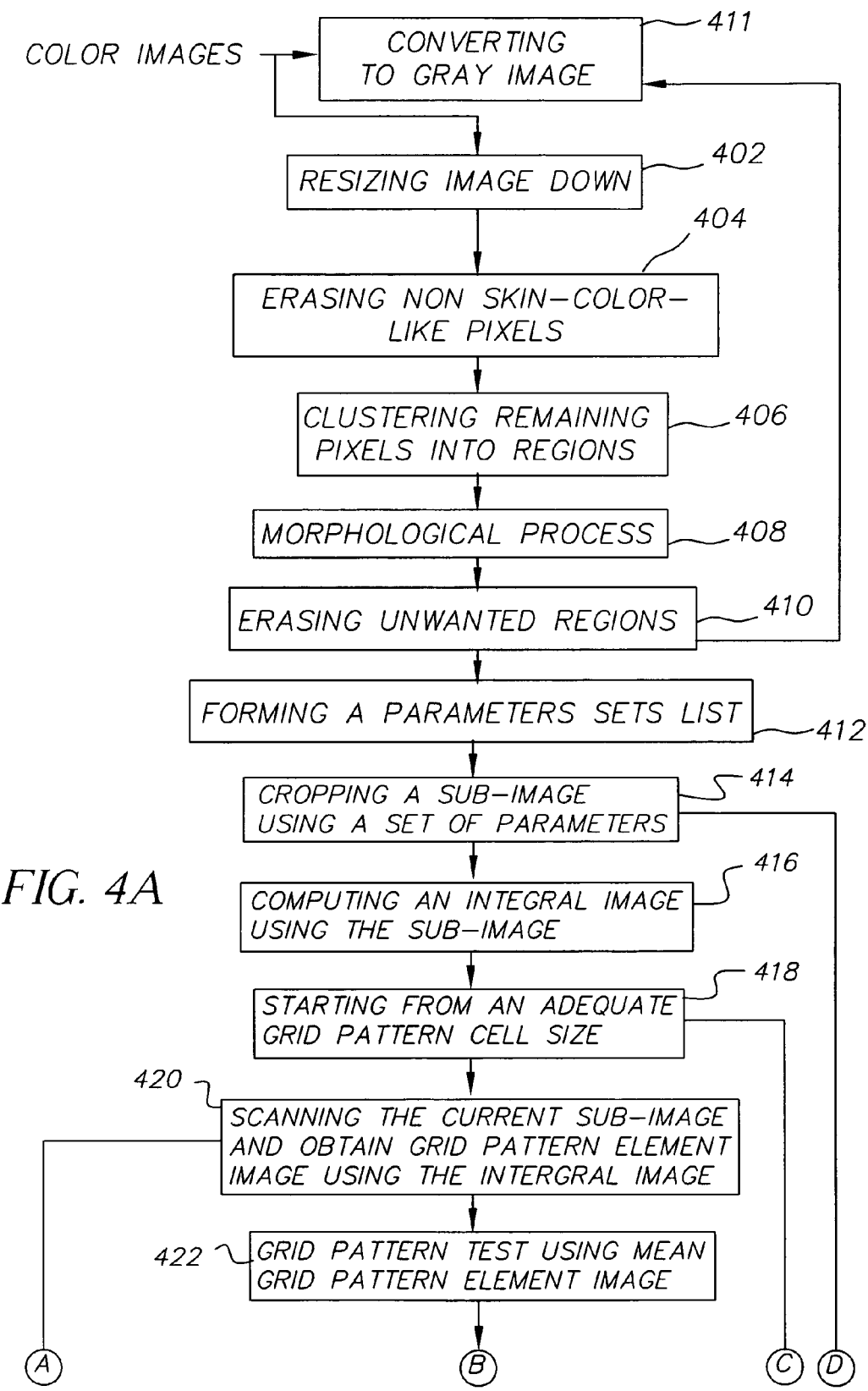
FIG. 4 is a flowchart illustrating a detailed process of face detection.
Figures 4, 4B:
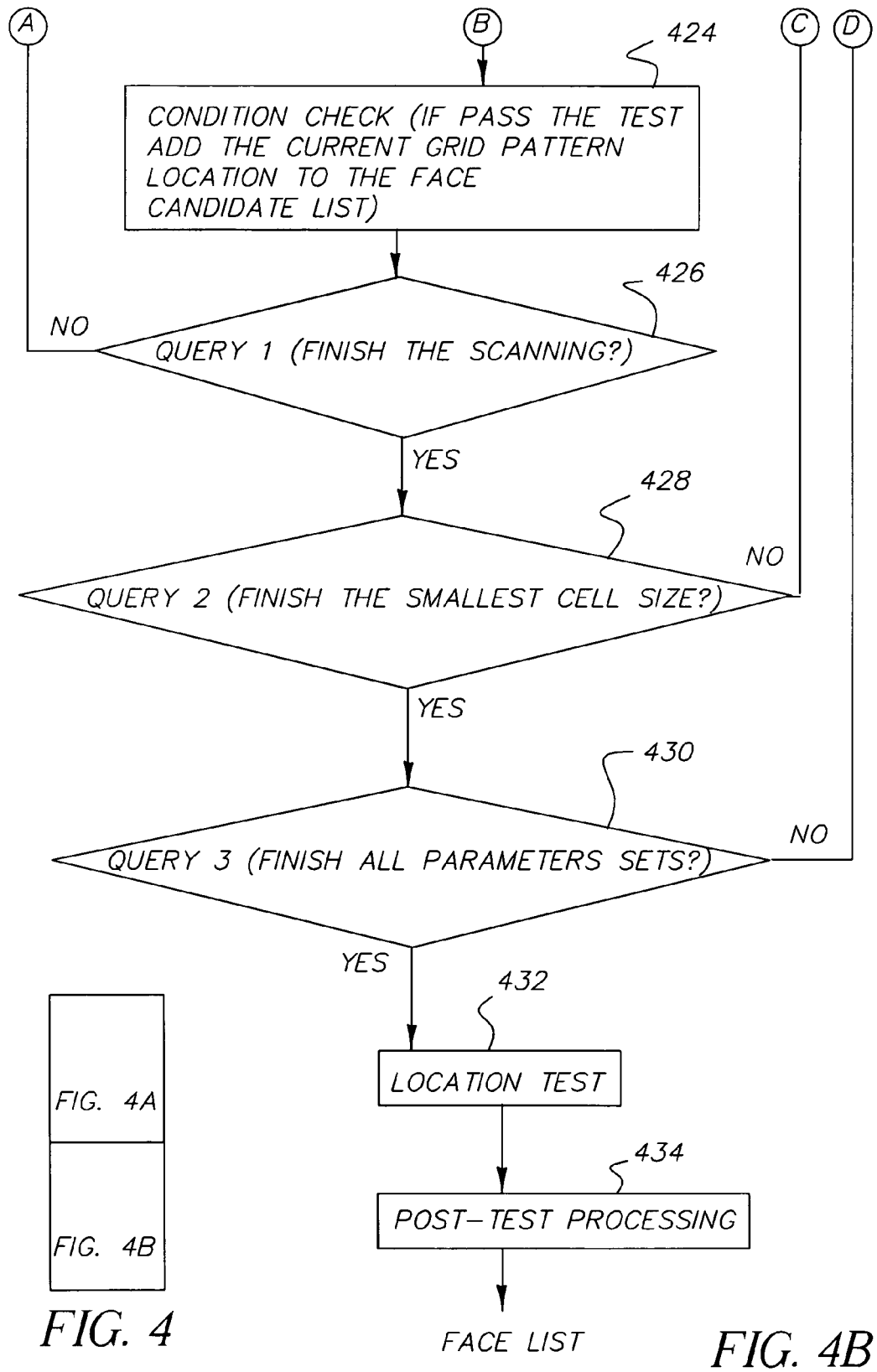

Referring now to FIG. 4, the method of the Grid Pattern Classifier 1602 will be described in greater detail. FIG. 4 is a flow chart illustrating finer steps of what shown in FIG. 2B. In the embodiment shown in FIG. 4, an input image having a standard size may first be resized downward in a resizing image down step 402. This step is optional to increase the processing speed of the method. An exemplary standard size input image could be 384×256. An exemplary resizing factor is 4. The purpose of resizing downward of the input image is to speed up the processes of the chromaticity test and the geometry test. The resized color image is processed in an erasing non-skin-color pixels step 404 (referred to as a chromaticity test 202 in FIG. 2B) to get rid of non-skin-color pixels. The non-skin color pixels are set to black.

Unlike traditional skin color detection algorithms, this chromaticity test has no color space conversion and skin color modeling involved. The test simply rejects any pixels if there is strong evidence that the colors of these pixels do not belong to skin colors, for example, pixels with saturated red color, green color or blue color. In the present method, if a pixel satisfies a set of conditions, it will be marked as a non-skin-color pixel by setting the pixel to zero. Symbolically, denote a color pixel at position (i, j) of a two-dimensional image plane by a vector $\langle R_{ij}, G_{ij}, B_{ij} \rangle$, denote the skin color pixel space by S, and non-skin color pixel space by $\overline{S}$. A pixel $\langle R_{ij}, G_{ij}, B_{ij} \rangle$ belongs to $\overline{S}$ if it satisfies one or more of the following empirical conditions:

$(R_{ij}/G_{ij}) \notin [R_{MIN}^G, R_{MAX}^G]$ $(R_{ij}/B_{ij}) \notin [R_{MIN}^B, R_{MAX}^B]$ $(R_{ij} \in [0, R_T]) \cap (G_{ij} \in [0, G_T]) \cap (B_{ij} \in [0, B_T])$ $(G_{ij} - B_{ij}) \notin [0, D_{GB}]$ where $R^x$ stands for the ratio of component R to component X (X is either G or B), $R_T, G_T, B_T$ and $D_{GB}$ are scalar thresholds.

If a pixel $\langle R_{ij}, G_{ij}, B_{ij} \rangle \in S$, its components retain their original values, while for any $\langle R_{ij}, G_{ij}, B_{ij} \rangle \in \overline{S}$, its components are set to zero.

Exemplary parameter values for the chromaticity test are set as the following:

$R_{MIN}^G = 1.06$ $R_{MAX}^G = 3.5$ $R_{MIN}^B = 1.1$ $R_{MAX}^B = 5.0$ $R_T = 20.0$ $R_T = 20.0$ $G_T = 20.0$ $B_T = 20.0$ $D_{GB} = 50.0$

Figure 12A:
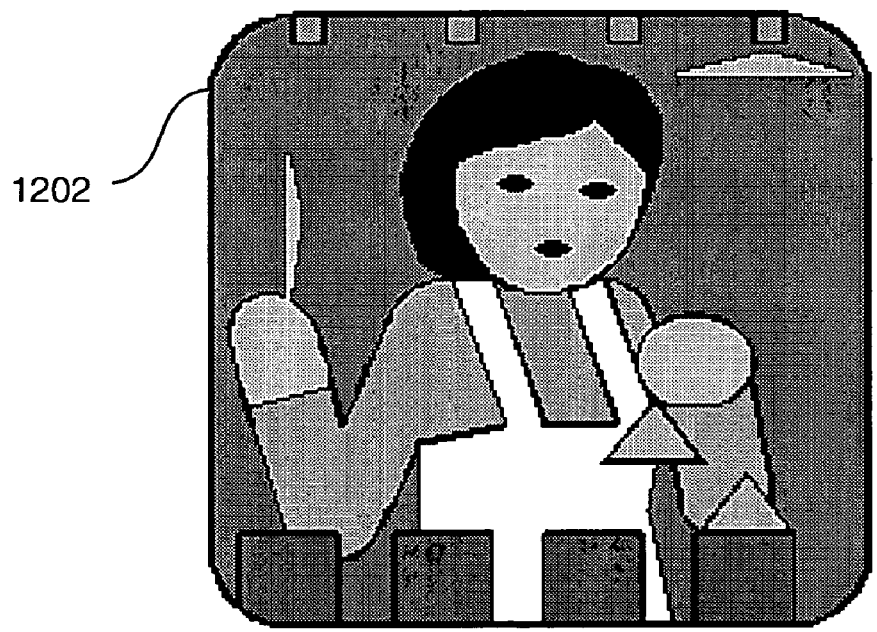
FIGS. 12A, B, C and D are illustrations useful in describing an image, a skin test, a geometry test, and the definition of a box for a skin color cluster respectively.
Figure 12B:
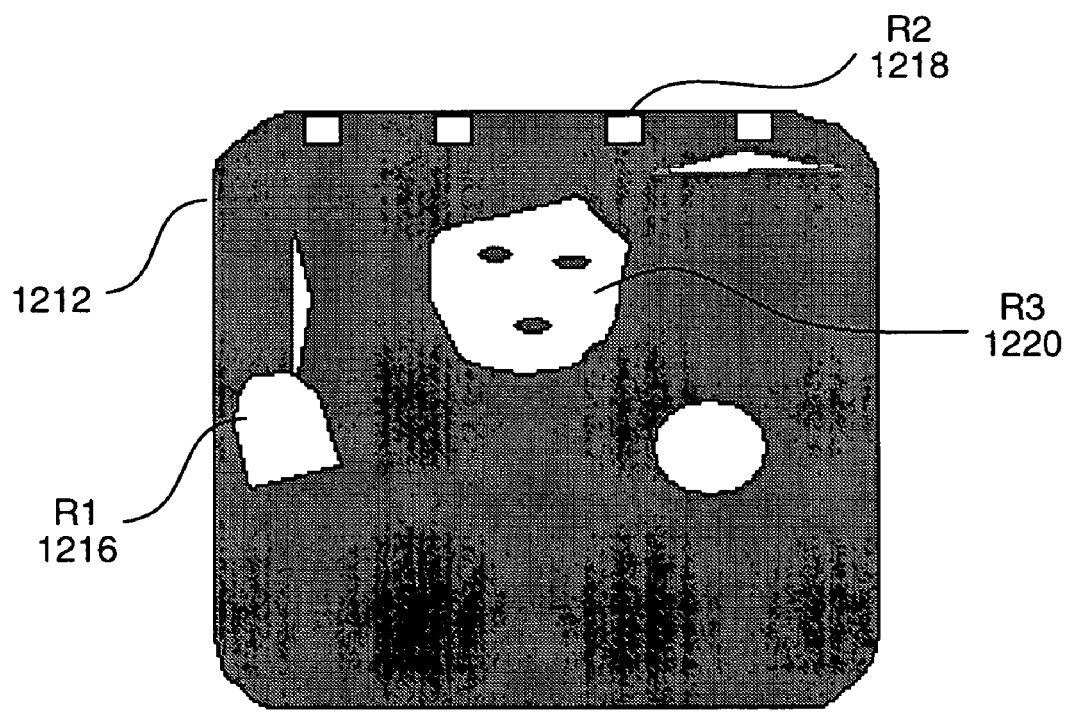

FIGS. 12A-D show an example of a chromaticity test. In FIG. 12A, there is an intensity color image 1202. In FIG. 12B, there is a first binary image 1212 that is the result after applying the chromaticity test to the intensity image 1202. In the first binary image 1212, a pixel in dark represents a non-skin-color pixel in the intensity image 1202, while a pixel in white represents a skin-color pixel in the intensity image 1202.

Figure 12C:
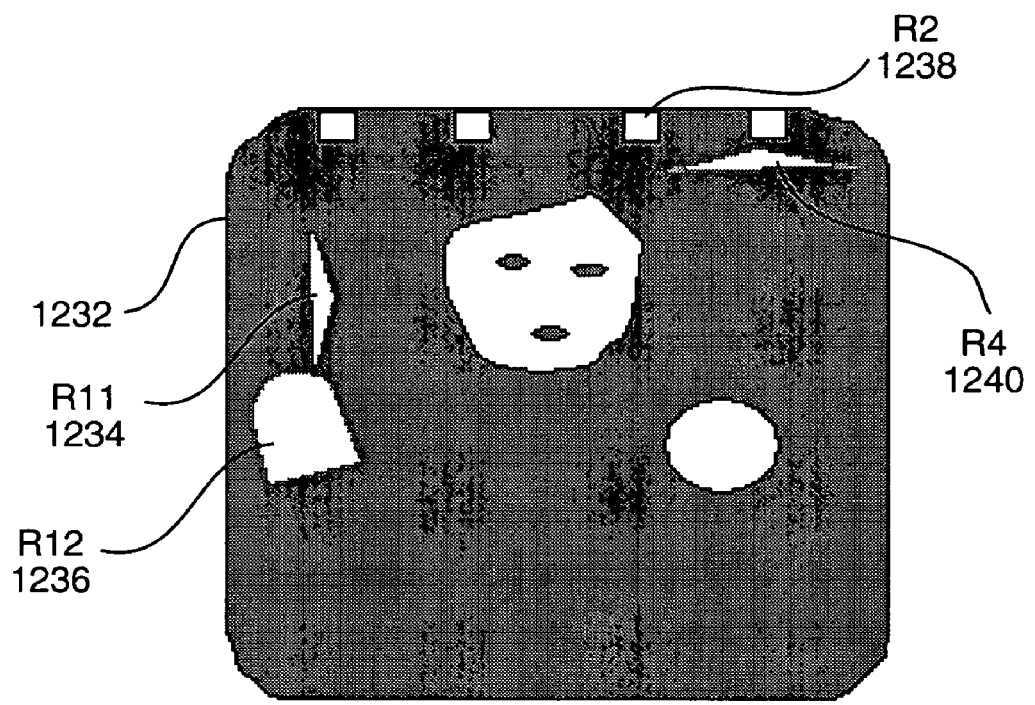
Figure 12D:
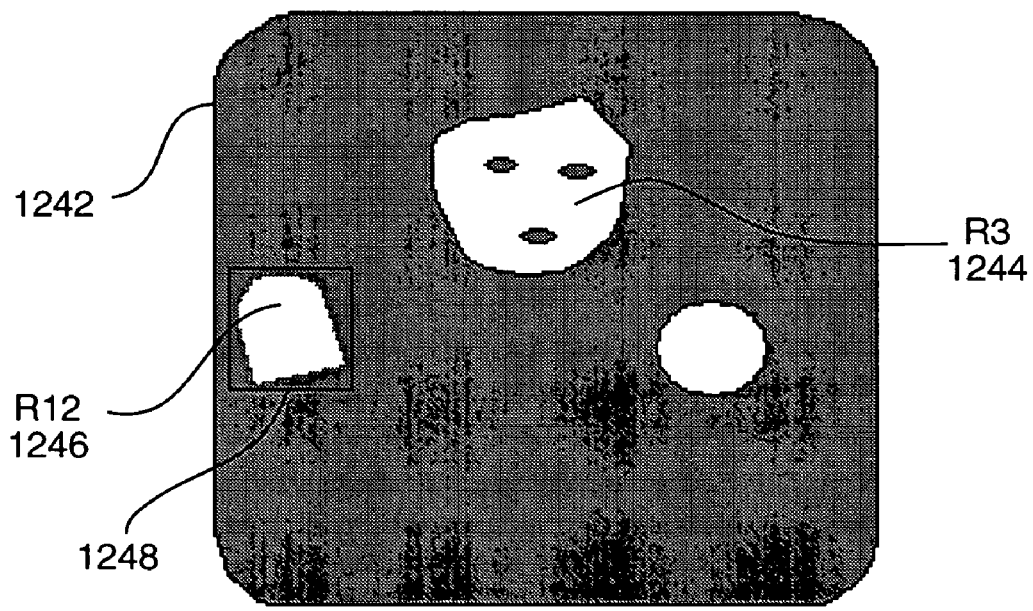

Now, referring back to FIG. 4, there are three steps (step of clustering remaining pixels into regions 406, step of morphological process 408, and step of erasing unwanted regions 410) responsible for implementing a geometry test 204. To better explain the test operation, example images in FIG. 12 B and C are referred to. An input image to the step of clustering remaining pixels into regions 406 is a binary image obtained from the chromaticity test 202 in FIG. 2B (or the step of erasing non-skin-color pixels 404 in the more detailed flow chart shown in FIG. 4). An example binary image is shown in the upper right part of FIG. 12B. Non-zero pixels in the first binary image 1212 are grouped into clusters. By definition, a cluster is a non-empty set of non-black pixels with the property that any pixel within the cluster is also within a predefined distance to another pixel in the cluster. An exemplary predefined distance is 1. Example clusters in the first binary image 1212 are cluster R1 (1216), cluster R2 (1218), and cluster R3 (1220). An interesting point is that cluster R1 (1216) is a combination of two barely touching clusters. After applying a morphological process 408 to the pixel clusters, cluster R1 (1216) in the binary image 1212 breaks into two clusters R11 (1234) and R12 (1236) in a second binary image 1232 (FIG. 12C).

The morphological operation in the geometry test step is implemented by evaluating the 8-connected neighbors of a non-zero pixel and deleting this pixel if the number of zero valued neighbors exceeds a threshold. The currently used threshold, $T_M$, is 5 and threshold is adjustable from application to application.

A final step in geometry test 204 is an erasing unwanted clusters step 410. Unwanted clusters are those clusters satisfying one or more of the following conditions:

$$W_R/H_R < T_W$$

$$H_R/W_R < T_H$$

$$A_R < T_A$$

$$\min(W_R, H_R) < T_S$$

where $W_R$ is the maximum width of a cluster, $H_R$ is the maximum height of a cluster, $T_W$, is a predefined maximum width to height ratio, $T_H$ is a predefined maximum height to width ratio, $A_R$ is the area of the cluster, and $T_A$ a predefined minimum area, $T_S$ is a predefined minimum size for either width or height. Pixels of the rejected clusters are set to zero.

Exemplary parameter values for the geometry test are chosen as following:

$T_W = 10.0$;

$T_H = 10.0$;

$T_A = 7$;

$T_S = 9$.

Examples of clusters to be erased are cluster R2 1238, cluster R11 1234 and cluster R4 1240 in the second binary image 1232 in FIG. 12C. The result of the erasing unwanted clusters 410 is a third binary image 1242 shown in FIG. 12D. Examples of remaining clusters are R3 1244 and R12 1246.

Referring to FIG. 2B, the step after the geometry test 204 is the grid pattern test 206. The grid pattern test 206 starts from a step of cropping a sub-image using a set of parameters 414 and continues to a step of query 3 (430) in FIG. 4. An intensity image to be used in the grid pattern test 206 is a gray scale image converted from the original color image in a step of converting to gray image 411 shown in FIG. 4. The parameters used in the cropping a sub-image step 414 are generated in a step of forming parameters sets list 412. A set of parameters contains a width, a height, and positions of an upper left corner of a rectangular box. The width of the box is a maximum width of a cluster retained in the geometry test 204. The height of the box is a maximum height of a cluster retained in the geometry test 204. An example of such a box is a box 1248 shown in FIG. 12D. The positions of the upper left corner of the box are defined with respect to the upper left corner of the binary image 1242. It should be understood that these parameters are re-scaled to fit the original image size before they are used to crop a sub-image from the gray scale image in the step of cropping a sub-image step 414.

Figure 3A:
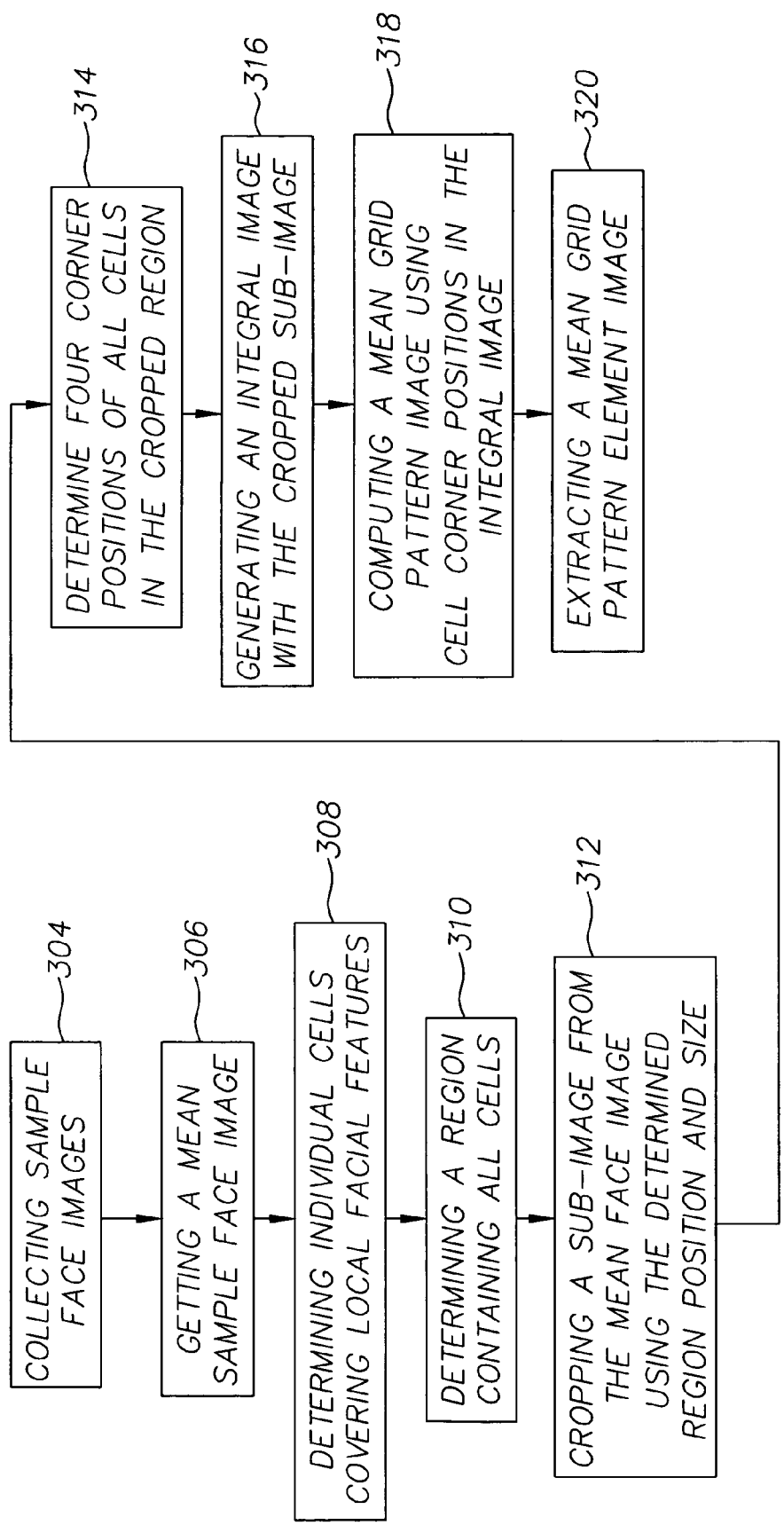
FIG. 3A is a flowchart illustrating a method of irregular grid pattern design.
Figure 5:
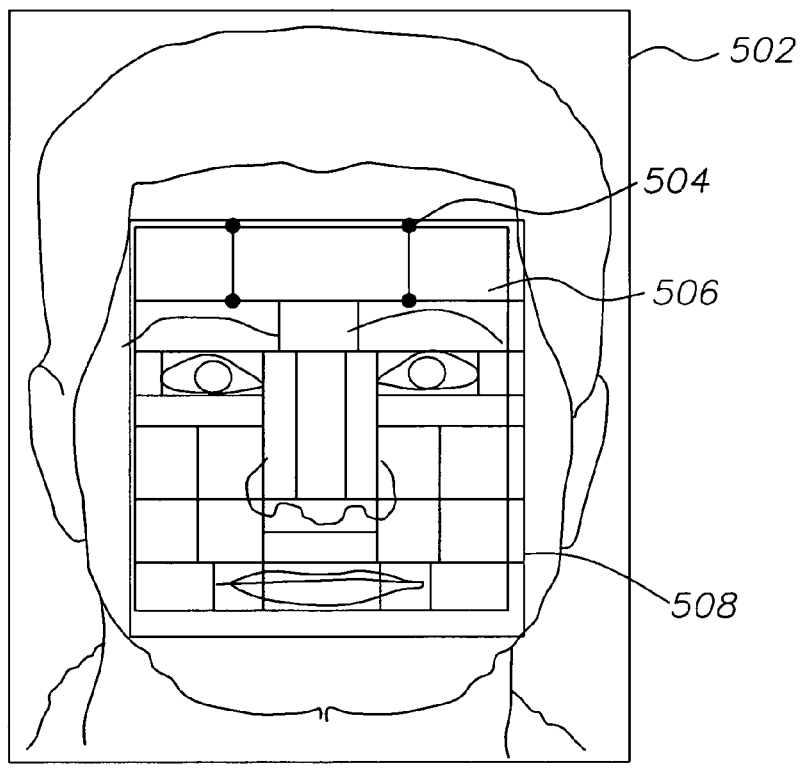
FIG. 5 is an illustration showing an irregular grid pattern.

The grid pattern test 206 uses a mean grid pattern element (MGPe) image generated in a mean grid pattern element image generator 212. There are two designs for generating an MGPe image. Design 1 is a generalized design. Design 2 is a special case of design 1. Steps of design 1 are described in FIG. 3A. A first step in design 1 is a step of collecting sample face images 304. A large number of cropped face images are manually collected. In a step of getting a mean face image 306, a mean face image is obtained by aligning two eyes of all the collected face images and taking average intensity for every pixel. To generate an MGPe image, grid cell sizes and positions are determined. In design 1, cells have different sizes and each one of them covers a specific area of the face cluster (step of determining individual cells covering local facial features 308). An example cell design 1 is shown in FIG. 5.

Figure 11A:
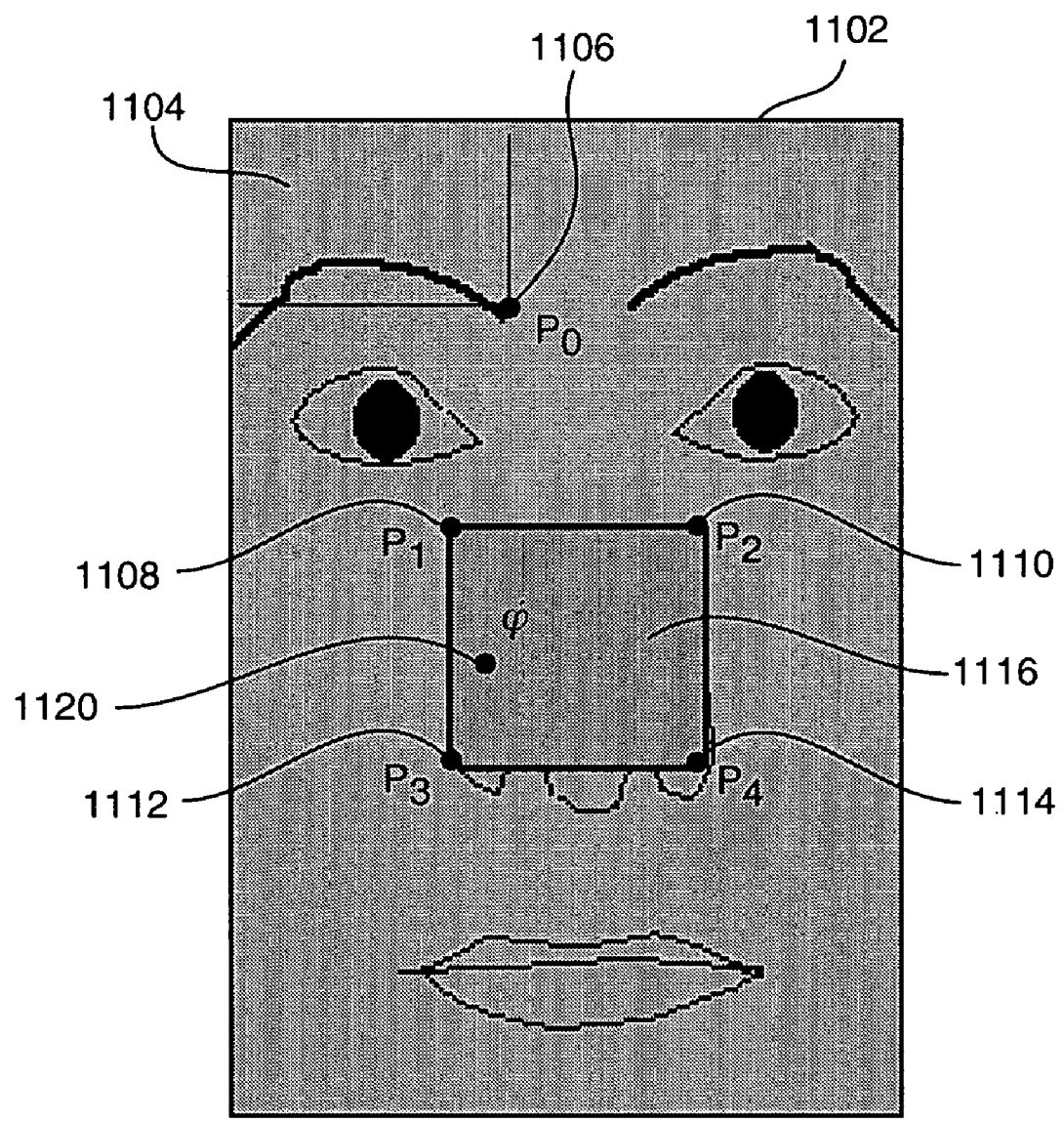
FIGS. 11A and B illustrate an intensity image and its associated integral image.
Figure 11B:
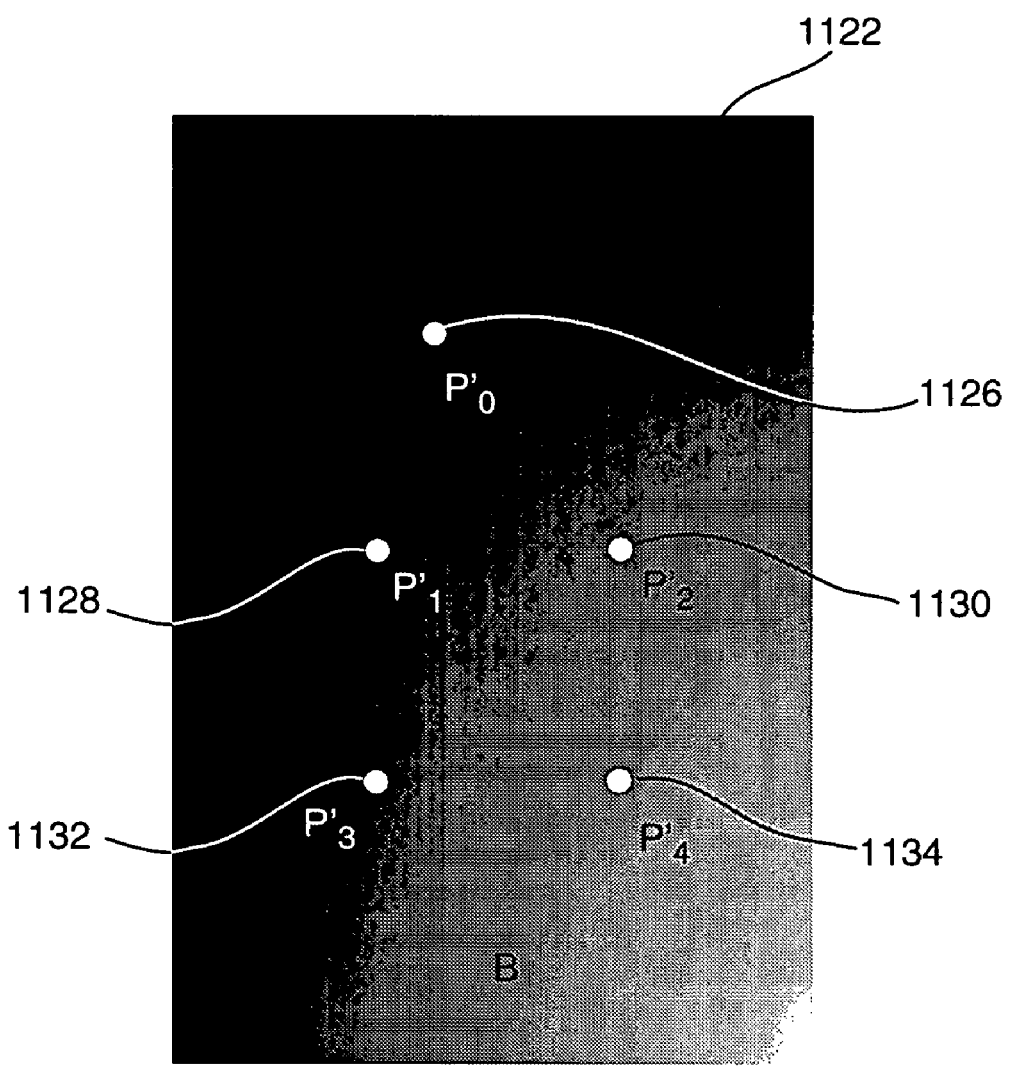

In a face image 502, there is a cell 506 covering the forehead area. Other examples of cell design 1 can also be seen in FIG. 5. A smallest box that contains all the cells is determined in a step of determining a box containing all cells 310. An example box 508 is shown in FIG. 5. Using this box, a sub-image of the mean face image can be obtained in a step of cropping a sub-image step 312. Four corner dots such as an upper right corner dot 504 of the cell 506 are thereby calculated with respect to the upper left corner of the sub-image in a step of determining four corner positions step 314. An efficient approach to compute a mean grid pattern element image is to use an integral image (see "Robust real-time object detection", by Paul Viola et al., *Proceedings of ICCV* 2002, which is incorporated herein by reference). An example of calculating the integral image is shown in FIG. 11. In FIG. 11, image A (1102) is a gray level intensity image and image B (1122) is an integral image of image A (1102). The integral image has the same size as the mean face intensity image. The computation of a pixel 1126 in integral image B (1122) is $$B(p'_0) = \sum_{\|p_i\| \leq \|p_0\|} A(p_i) \tag{1}$$

where $A(p_i)|_{\|p_i\| \leq \|p_0\|}$ defines a region 1104 in the mean face image 1102. $p_i$ is a vector in the two dimensional image plane which has an origin at the upper left corner. In the above case, $p_0 = p_0'$. In practice, Equation (2) is replaced by a pair of recurrences introduced in Viola's paper for speedy computation.

After obtaining an integral image in a step of generating an integral image with the cropped sub-image 316, a mean grid pattern image is computed in a step of computing a mean grid pattern image using cell corner positions in the integral image 318. It should be understood that the mean grid pattern image is different from the mean grid pattern element image. The mean grid pattern image has the same size as the mean face intensity image. The mean grid pattern element image is extracted from the mean grid pattern image. Now referring back to FIG. 11, there is a cell 1116 defined by four corner points $p_1$ (1108), $p_2$ (1110), $p_3$ (1112), and $p_4$ (1114). This cell covers a nose area of the mean face image. This cell also represents a cell in the same position in the mean grid pattern image to be computed from the mean face image. The computation of any pixels in this cell for the mean grid pattern image is expressed as $$\varphi = \frac{1}{mn}(B(p'_4) + B(p'_1) - B(p'_2) - B(p'_3))\Big|_{\varphi \in \Phi[p_1, p_2, p_3, p_4]} \quad (2)$$

where $\Phi[p_1, p_2, p_3, p_4]$ is the cell defined by four corner points $p_1$ (1108), $p_2$ (1110), $p_3$ (1112), and $p_4$ (1114) in the grid pattern image, $\phi$ is any pixel in cell $\Phi[p_1, p_2, p_3, p_4]$, $B(p'_x)$ is the pixel value at positions $p'_x$ (they are $p'_1$ 1128, $p'_2$ 1130, $p'_3$ 1132, and $p'_4$ 1134) in the integral image (here, $p_1=p'_1$, $p_2=p'_2$, $p_3=p'_3$, and $p_4=p'_4$), m is the cell height and n is the cell width. In this manner, the resolution of the mean face image is reduced to the resolution of the selected grid pattern by the averaging process expressed in equation (2).

Since all pixels in a cell have a same value, only one pixel for each cell (for example, $\phi$ 1120 for the nose cell 1116 in FIG. 11) is needed to construct the mean grid pattern element image. For design 1, the format of the mean grid pattern element image could be a one dimensional image or a two dimensional image. A preferred format is the one dimensional image. For constructing the mean grid pattern element image, simply copy one pixel from each of the cells of the mean grid pattern image to a pixel in the mean grid pattern element image in an order. The number of pixels in the mean grid pattern element (MGPe) image equals the number of cells in the mean grid pattern image. The order of pixel copying process for this operation needs to be recorded so that in the grid pattern test 206 the same order can be used to form a grid pattern element image for images under testing if design 1 is selected.

It is understood that since the mean grid pattern element (MGPe) image takes only one pixel from each of the cells, statistically, the size of the cropped sub-image (thereby, size of individual cells) should not matter. The MGPe image is simply a statistical measure of the main features of a mean face. Practically, an exemplary size for the cropped sub-image for generating an MGPe image could be 105×105.

Figure 3B:
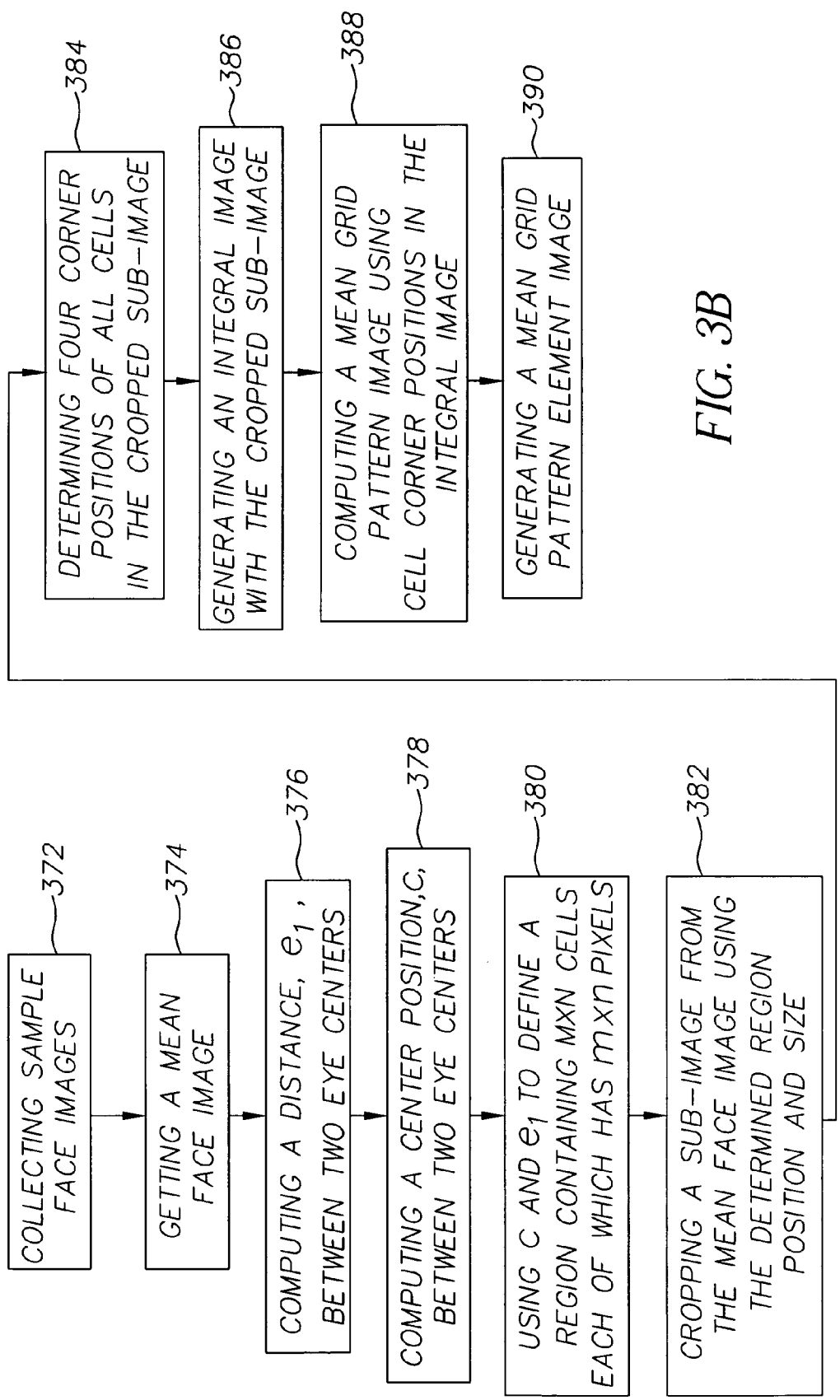
FIG. 3B is a flowchart illustrating a method of regular grid pattern design.
Figure 6:
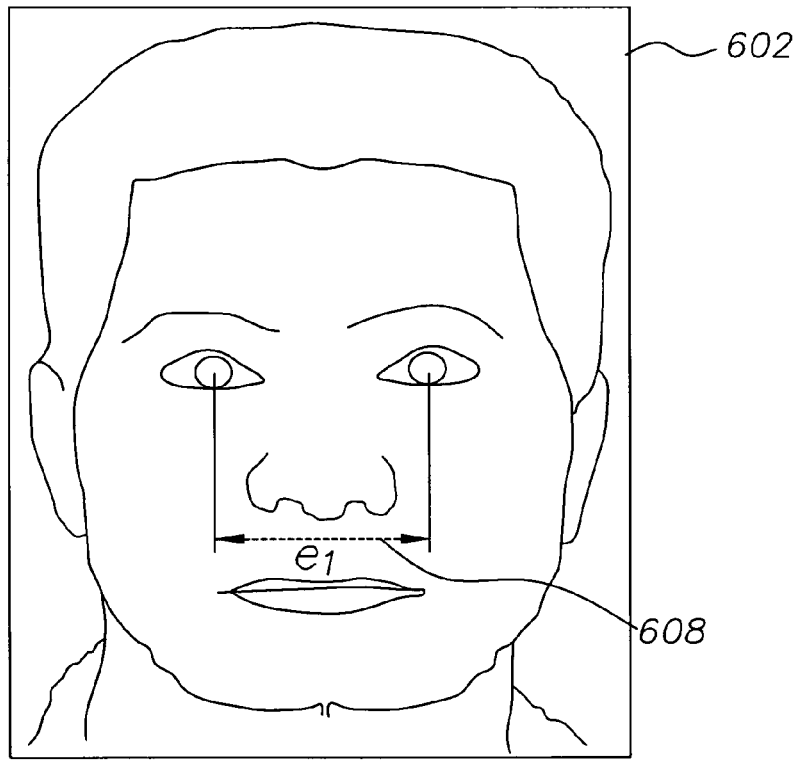
FIG. 6 is an illustration showing key positions for a regular grid pattern design.
Figure 7:
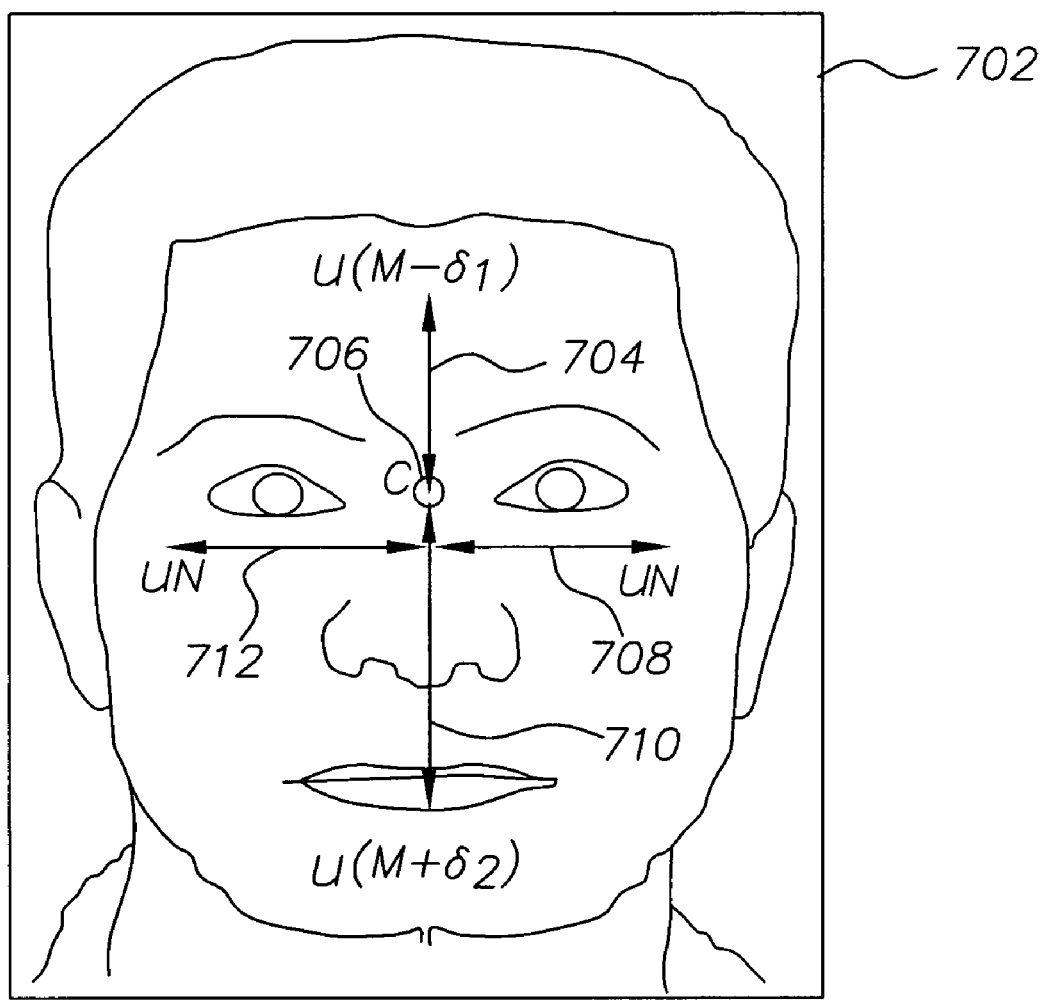
FIG. 7 is an illustration showing position and size parameters for a regular grid pattern design.
Figure 8:
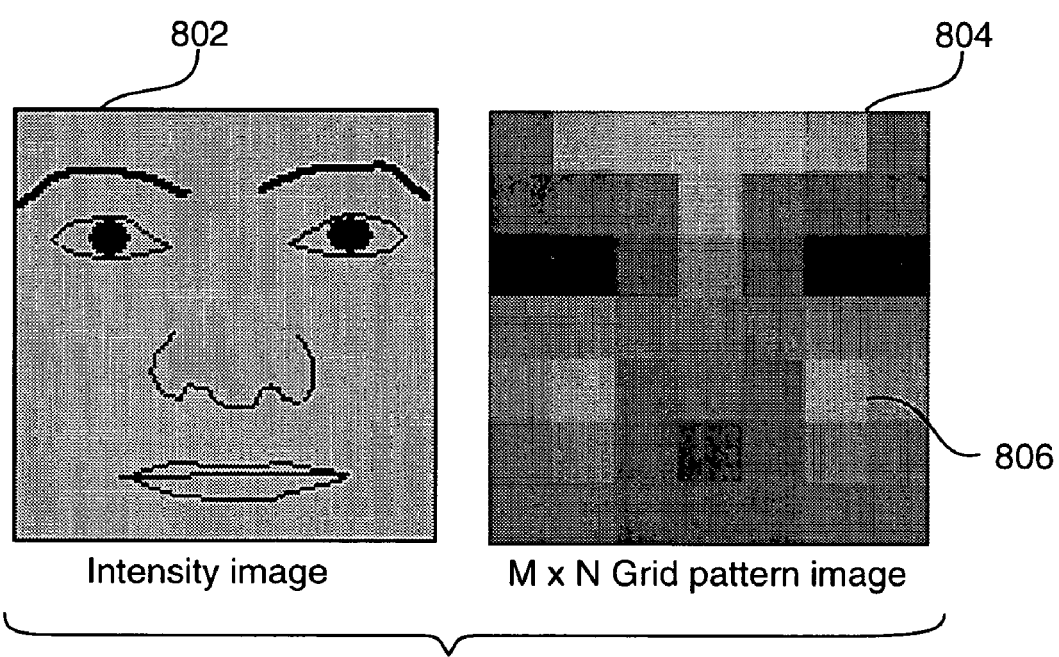
FIG. 8 is an illustration of an intensity face image and its regular grid pattern image.

Referring now to FIG. 3B, there is a flowchart describing design 2 for generating an MGPe image. A first step in design 2 is a step of collecting sample face images 372 in FIG. 3B. A large number of cropped face images are manually collected. In a getting a mean face image step 374, a mean face image is obtained by aligning two eyes of all the collected face images and taking average intensity for every pixel. To generate an MGPe image, grid cell sizes and positions have to be determined. In design 2, all cells have the same size. The design starts at a step of computing a distance, $e_1$ (608 in a face image 602 in FIG. 6), between two eye centers 376. It then finds the center position, c (706 in a face image 702 in FIG. 7), between the two eye centers in a step of computing a center position 378. The distance, $e_1$ (608), and center position, c (706), are used in a step of using distance, $e_1$, and center position, c to define a region containing M×N cells each of which has m×n pixels 380. Denote a unit distance by u. Let $u=e_1/f$. A preferred value of f is 8. In FIG. 7, starting from the center, c (706) there are four arrows (arrow 704, arrow 708, arrow 710 and arrow 712) pointing east, west, north and south respectively. Tips of the arrows define boundaries of a box to be used to crop the mean face image in order to compute the MGPe image. As shown in FIG. 7, the upper boundary is $(M-\delta_1)$ units (u) away from the center c, the lower boundary is $(M+\delta_2)$ units (u) away from the center, left boundary is N units (u) away from the center, and right boundary is N units (u) away from the center. Note that the physical length of unit u depends on the size of the mean face image. An exemplary value for M is 7, for N is 7, for $\delta_1$ is 2, and for $\delta_2$ is 2. In this case, as shown in FIG. 8, the design has square cells (such as cell 806) all having a same size and a square cropping region used in a step of cropping a sub-image 382 (see the cropped sub-image 802 from the mean face image shown in FIG. 8).

For design 2, positions of four corners of a cell 506 can be easily calculated with respect to the upper left corner of the sub-image in a step of determining four corner positions step 384. After getting corner positions for all cells, for design 2, subsequent steps (step of generating an integral image 386, step of computing a mean grid pattern image 388 and step of generating a mean grid pattern element image 390) are very much the same as that in design 1.

It is understood again that since the mean grid pattern element (MGPe) image takes only one pixel from each of the cells, statistically, the size of the cropped sub-image (thereby, size of individual cells) should not matter. The MGPe image is simply a statistical measure of main features of a mean face. Practically, an exemplary size for the cropped sub-image for design 2 could be 105×105 with 7×7 cells each of which has 15×15 pixels. Thereby, the mean grid pattern element (MGPe) image has 49 elements.

Before referring back to FIG. 4, the use of the MGPe image needs to be discussed. From the previous discussions, it is known that an MGPe image gathers the statistical information (structural information and intensity information) of a mean face region. To localize a face in an image, a type of measure has to be determined. In the present invention, a statistic, i.e., a correlation coefficient (see "The statistical analysis of time series" by T. W. Anderson, John Wiley & Sons, Inc, 1994, chapter 6, which is incorporated herein by reference), of two variables is used for classifying faces or non-face objects. The two variables here are a mean grid pattern element (MGPe) image and a grid pattern element (GPe) image of an image under testing. The GPe image should have the same size as the MGPe image.

Denote the MGPe image by $\Phi_0$ and the GPe image by $\Phi_1$. The correlation coefficient between these two variables is $$r = \mu^{11}/\sigma_{\Phi_i}\sigma_{\Phi_j}, \|r\| \leq 1 \quad (3)$$

where $$\mu_{11} = E\{\Phi_i \Phi_j\} - E\{\Phi_i\}E\{\Phi_j\}$$

$$\sigma^2_{\Phi_k} = E\{(\Phi_k - E\{\Phi_k\})^2\} \quad (4)$$

here $E\{\}$ is an expectation operator.

To use the correlation coefficient r as a statistical measure to separate non-face objects and faces, distributions of the correlation coefficients between MPGe of the mean face and GPe of faces and the correlation coefficients between MPGe of the mean face and GPe of non-face objects are inspected.

Figure 9:
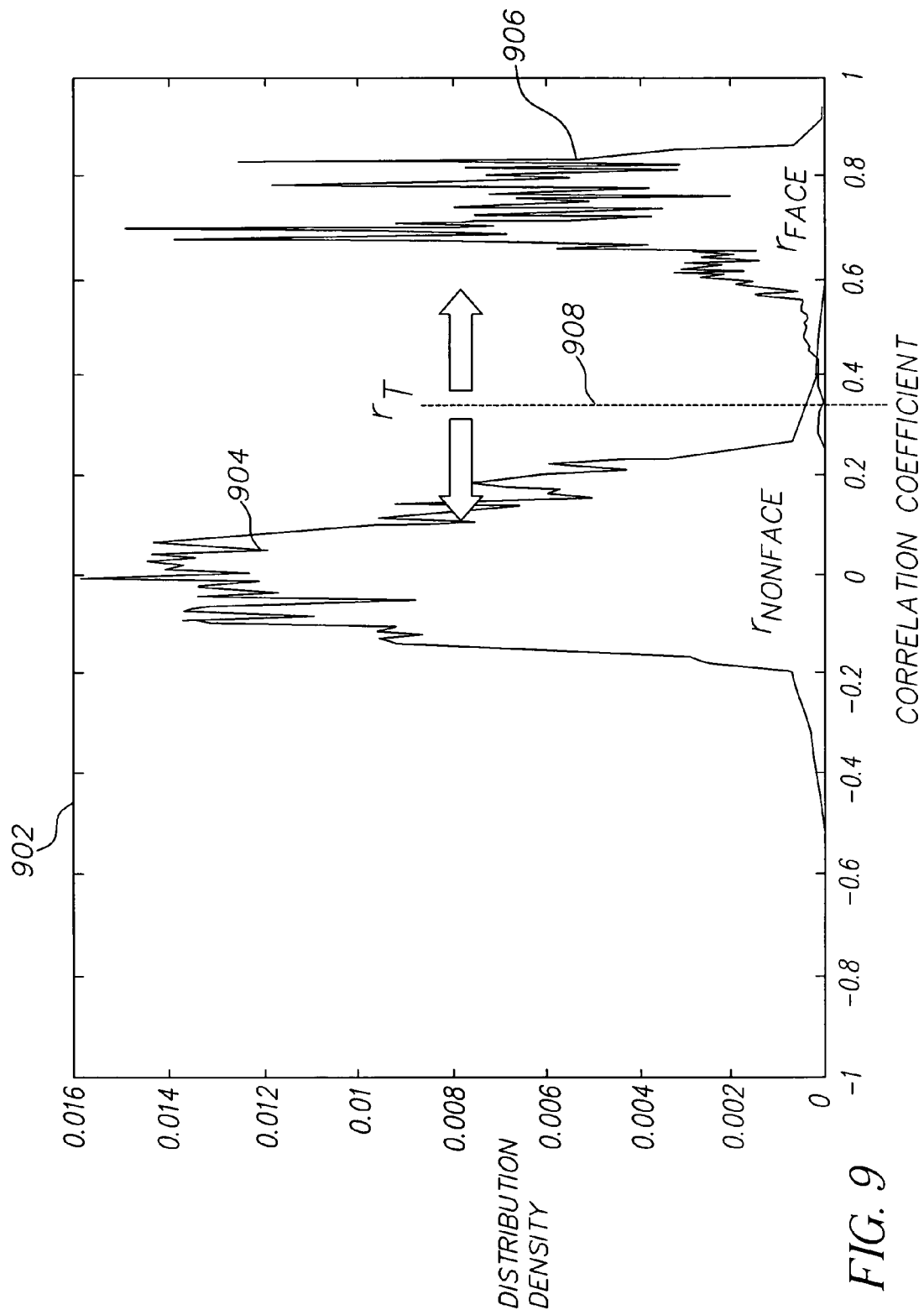
FIG. 9 is a graph illustrating distributions of correlation coefficients for face grid pattern images and the mean face grid pattern image, and non-face grid pattern images and the mean face grid pattern image.

A large number of sample faces are used to generate face grid pattern element (GPe) images using the method described in design 2 above (step 376 through step 390). Note that this time, GPe is generated for each individual sample face image, not for a mean image. After applying Equation (4) to the MGPe and each of the individual face GPes, a large number of correlation coefficients are produced. An example distribution of these coefficients is depicted in FIG. 9 by a curve 906 in chart 902. Noticeably, for face GPes, the correlation coefficients are mostly distributed between 0.4 to 1. The same procedures can be applied to a large number of non-face sample images. An example distribution of correlation coefficients between the MGPe and the non-face GPes is depicted in FIG. 9 by a curve 904 in chart 902. Noticeably, for non-face GPes, the correlation coefficients are mostly distributed below 0.4.

Figure 10:
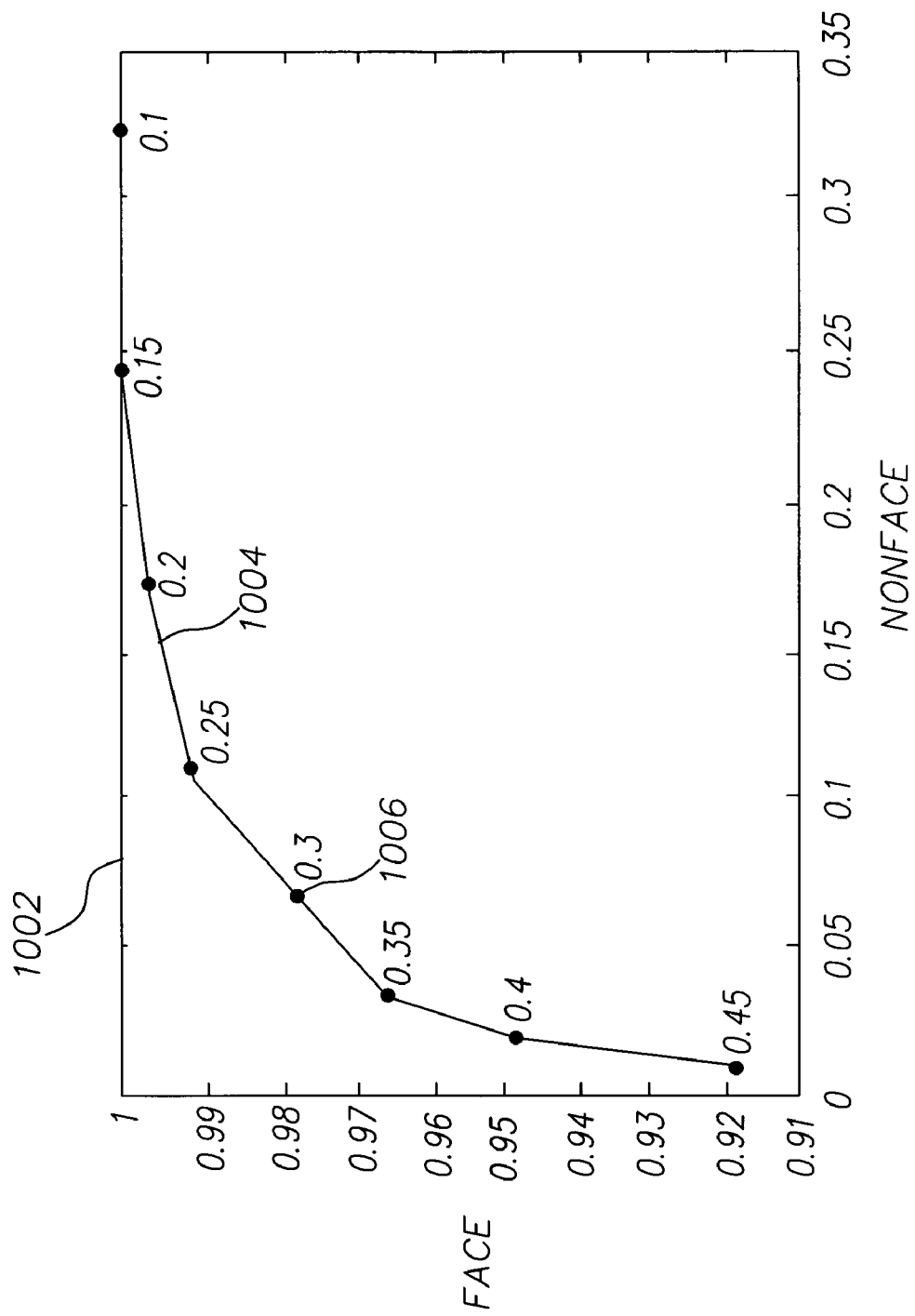
FIG. 10 is a graph illustrating face detection rates and false positive rates as functions of threshold values using the present invention.

Therefore, by changing a threshold, $r_T$ (908), a balanced true positive (correctly classified face) verses false positive (falsely classified face) performance is achievable. Chart 1002 in FIG. 10 shows a curve 1004 that depicts the performance of true positives verses false positives as a function of the threshold $r_T$ (908). For example, a threshold value 0.3 (1006) confirms approximately 97.8% of the faces from the sample face set, while the same threshold falsely accepts roughly 6.2% of the non-faces from the non-face set as faces.

Referring back to FIG. 2B, the grid pattern test 206 is detailed by steps starting with a step of cropping a sub-image 414 and continuing to a step of query 3 (428) in FIG. 4.

Recall that the parameters used in the cropping a sub-image step 414 are generated in a forming parameters sets list step 412. A set of parameters contains a width, a height, and positions of an upper left corner of a rectangular box. The width of the box is a maximum width of a cluster retained in the geometry test 204. The height of the box is a maximum height of a cluster retained in the geometry test 204. An example of such a box is a box 1248 shown in FIG. 12. The positions of the upper left corner of the box are defined with respect to the upper left corner of the binary image 1242. It should be understood that these parameters are re-scaled to fit the original image size before they are used to crop a sub-image from the gray scale image in the step of cropping a sub-image step 414.

For each set of parameters from the list, a sub-image is cropped from a gray image obtained from a step of converting gray image 411. Notice that this gray image has all but pixels retained in the step of erasing unwanted clusters 410 set to black. Remember, parameters from step 410 have to be resealed before they can used in step 411. The gray image may have objects such as shown in example image 1242. An example set of parameters may crop a sub-image having the same size as box 1248. This sub-image has a cluster such as R12 (1246). This cluster has gray scale pixels. Pixels outside the cluster are black. With this sub-image, a corresponding integral image can be computed in a step of computing an integral image 416.

In a cropped sub-image, if there are any faces, their sizes are unknown. Therefore, the cropped sub-image of the digital color image must be evaluated at a plurality of effective resolutions, which is done by reducing the cropped sub-image to a plurality of grid pattern element images (GPe images) at different effective resolutions and then correlating the MPGe image with the GPe image at each resolution. So, the search of faces starts with a maximum possible cell size, $S_{Max}$, (see a step of starting from an adequate grid pattern cell size 418) all the way down to a minimum allowable cell size, $S_{Min}$, (see a step of query 2 (428)). Suppose a 7×7 grid pattern element image (see 806 as an example) format is used for the face detection. Suppose the cropped sub-image has a size of 70×70. The maximum possible cell size is $S_{Max}$=10×10 in this case. The minimum allowable cell size, $S_{Min}$, is predefined. An exemplary minimum allowable cell size is $S_{Min}$=2×2. With this 70×70 sub-image, only one search can be conducted for a cell size of 10×10. That is because, for a 7×7 grid pattern element image, it needs a 70×70 region to support cells having a size of 10×10, i.e., there is only one search position for the 7×7 grid pattern element image in the 70×70 pixel region. In contrast, a 7×7 grid pattern element image only needs a 14×14 pixel region to support cells having a size 2×2 pixels; consequently there are many possible different search placements of the resulting 7×7 pattern in the 70×70 pixel region. In practice, the 14×14 support region will be stepped through the 70×70 sub-image to cover all possible grid pattern positions, and there will be 3249 searches for the minimum allowable cell size, that is, if the search step size is 1. There also can be a predefined maximum allowable cell size, $S_{Max}$. An exemplary maximum allowable cell size is $S_{Max}$=25×25. The difference between two consecutive cell sizes can be determined by a predefined scale factor. An exemplary scale factor could be $2^{1/8}$.

The grid pattern test basically correlates a type of MGPe image to a GPe image obtained from the test image. Recall that there are two types of MGPe. An irregular MGPe image (from design 1) and a regular MGPe image (from design 2).

If an irregular MPGe is selected, starting with maximum possible cell sizes, a step of scanning the current sub-image 420 crops a patch of the integral image computed from the cropped sub-image in step 416. Step 420 then uses the patch of the integral image and the irregular grid pattern type for computing the MGPe to compute a grid pattern element (GPe) image. In a step of grid pattern testing 422, a test is performed to see if a patch of the sub-image image corresponding to the cropped integral image patch represents a face by evaluating a correlation coefficient of the GPe and the MGPe. If the GPe computed from the cropped integral image patch passes the grid pattern test (that is, the correlation coefficient is greater than a predefined threshold, $r_T$ (908)), the position and size parameters of the current patch are stored in a face candidates list in a step of condition check 424.

If a regular grid pattern is selected, starting with a maximum possible cell size, a step of scanning the current sub-image 420 uses the integral image and the regular grid pattern type used for computing MGPe to compute a grid pattern element, (GPe) image with the selected cell size for the cropped sub-image. Step 420 then crops a patch of the GPe image such that the patch has the same size of the MGPe image. In a step of grid pattern testing 422, a test is performed to see if a patch of the sub-image corresponding to the cropped GPe patch represents a face by evaluating a correlation coefficient of the GPe and the MGPe. If the GPe patch cropped from the GPe image passes the grid pattern test (that is, the correlation coefficient is greater than a predefined threshold, $r_T$ (908)), the position and size parameters of the current patch are stored in a face candidates list in a step of condition check 424.

The above described grid pattern test is performed for all areas within a cropped sub-image (see step of query 1 (426)), for all adequate cell sizes (see step of query 2 (428)), and for all parameter sets (see step of query 3 (430)).

Figure 13:
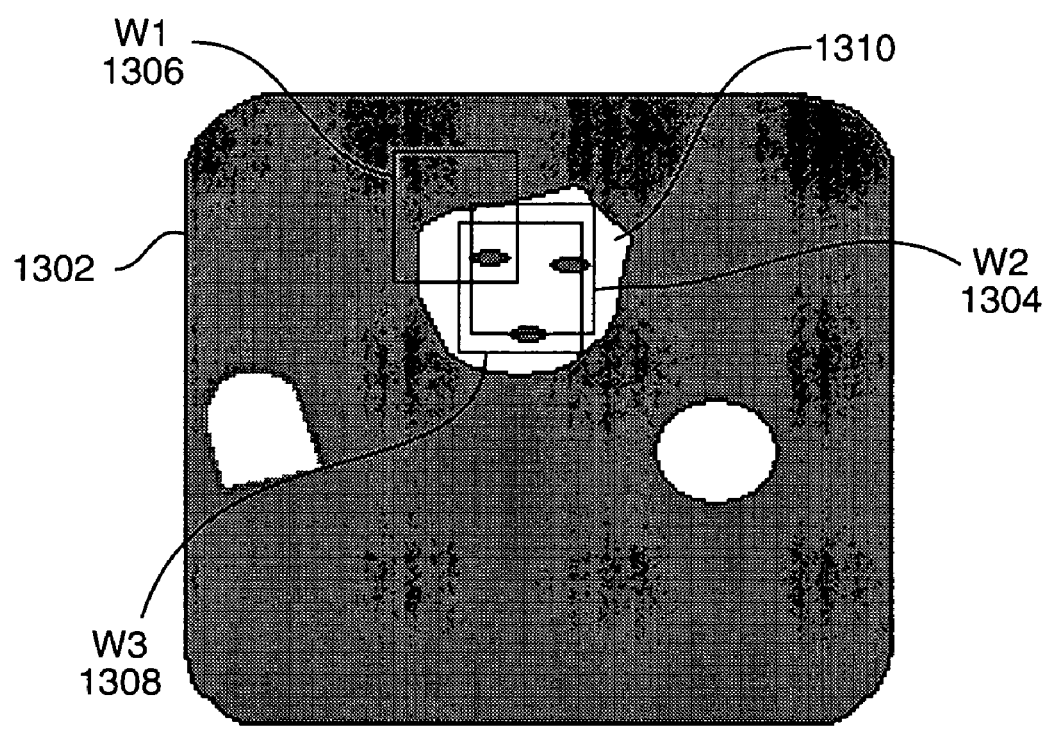
FIG. 13 is an illustration useful in describing a location test and post-test processing.

After having a list of face candidates, a step of location testing 432 tests the face candidate areas defined by the stored parameters. The said testing removes a set of parameters from the face candidates list if the area defined by the said set of parameters contains less than a predefined percentage of a cluster retained in step 410. An exemplary candidate to be removed is shown in FIG. 13. Candidate W1 (1306) partially covers a face area, so it is removed from the candidate list.

A final step of post-test processing 434 updates the face candidates parameters list revised in step 432 by merging neighboring candidates based on a distance measure of the centers of the candidate areas. Exemplary candidates W2 (1304) and W3 (1308) in FIG. 13 are close to each other, so they are to be merged. An exemplary distance measure is an Euclidean distance of one half of the average of the box (candidate areas) heights.

The output of the step of post-test processing 434 presents a set of face candidates (rectangular windows) to the subsequent step of cascaded classifier 1604. The grid pattern classifier also provides an intermediate image result 1414 with non-skin pixels set to zeros and face candidate windows are outlined.

2. Cascaded Classifier

Figure 16:
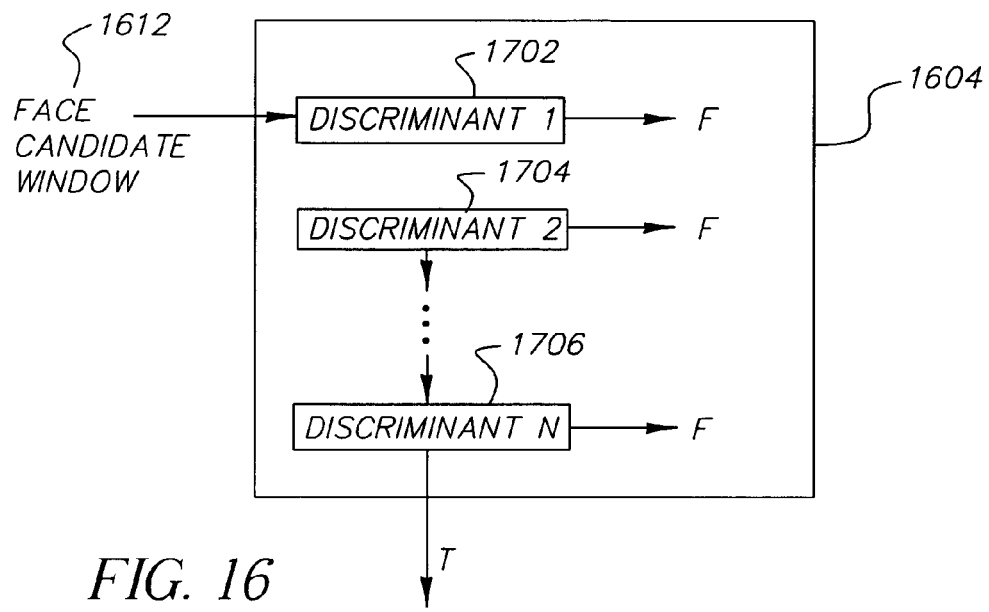
FIG. 16 is an illustration of a cascaded classifier.

This cascaded classifier 1604 builds upon an algorithm described in Viola, Paul, and Jones, Michael, "Robust Real-Time Object Recognition", *Proc. Second International Workshop on Statistical and Computational Theories of Vision—Modeling, Learning, Computing, and Sampling*, Vancouver, 2001. The basic model is illustrated in FIG. 16. The cascaded classifier consists of a number of independent discriminating modules, (discriminant 1 (1702), Discriminant 2 (1704), through Discriminant n (1706)) each called a strong classifier. (The rationale behind this terminology will become evident later.) Each module is trained (using a process to be introduced later) to discriminate between face and non-face windows by examining specific image measurements (that will be explained below) from a face candidate window. The training of each module does not treat all classification errors equally; rather, false negative (FN) errors (in which true faces are erroneously rejected) receive great importance, while false positive (FP) errors cause relatively minor concern. (False positive errors occur when non-faces are erroneously identified as faces.) Thus, the training of each module biases it so that it passes the overwhelming majority of true objects, while weeding out some reasonable fraction of non-face windows. Once a window has been rejected by any level in the cascade, processing of the window stops with a non-face classification.

The speed advantage of this scheme of cascaded classification lays in its immediate rejection of windows that fail the discrimination test at any level. If, for example, the false positive rates $f_1$ and $f_2$ of the first two levels were both 0.5, then 75% of all test windows (the vast majority of which do not contain the face of interest) will be rejected by one of the first two levels. (Training for level two will involve non-face windows passed by level one. Hence, the FP errors of the levels are uncorrelated, and the FP rates can be multiplied.) In the end, only windows containing the face, and successfully classified as face, will be processed by all levels. Thus, the test speed of the cascaded classifier will be heavily dominated by the speed of the first few levels.

The discriminative power of this scheme of cascaded classification lays in its compounding nature. If the various modules can be trained so that they become increasingly discriminative, each rejecting some modest fraction of the FPs passed by previous levels, then the overall FP rate will decline exponentially with level. Specifically, suppose the true and false positive rates of module i are $t_i$ and $f_i$ respectively; and where the $f_i$ are measured on window sets that pass through the previous classifier levels. Then, the final classifier performance will result as $$T = \prod_{i=1}^{\# levels} t_i \qquad (F1)$$

$$F = \prod_{i=1}^{\# levels} f_i$$

How strict would such training requirements be? Suppose desired target T, the total TP rate, equals 90% and F, the total FP rate, equals $10^{-6}$. Assuming $t_i$ and $f_i$ constant across all levels (for simplicity of estimation, labeled t and f) would require $t = \sqrt[n]{0.90} = 0.995$ and $f = \sqrt[n]{10^{-6}} = 0.50$, assuming n=20 levels of classifiers.

Strong Classifiers

Each discriminating level in the cascaded classifier is called a strong classifier. This name derives from the fact that the strong classifiers discriminate the classes based on the voting decisions of a number (perhaps a large number) of "weak classifiers". A weak classifier (described next) is any classification engine that performs better than chance on a given classification task. Weak classifiers (say, T in number) combine to form a strong classifier using a linear decision rule $$h(I) = \begin{cases} 1 & \sum_{t=1}^{T} \alpha_t h_t(I) \geq h_{thr} \\ 0 & \text{otherwise} \end{cases} \qquad (F2)$$

where $h_{thr}$ is a constant threshold determined during training. The concept of strong classifier contrasts with that of weak classifier. Whereas the weak classifier need only label training cases with an arbitrary advantage over chance labeling, a strong classifier will eventually label training cases with arbitrary accuracy. The weak and strong classifier terminology comes from the mathematical theory of machine learning. Perhaps a motivating rationale might be the following. In most situations, the ultimate desire is to build a strong classifier.

Unfortunately, most frequently there exist no easy, direct methods for building such a classifier. If the method were that clear, the problem would have already been solved. On the other hand, it frequently can happen to be easy to build an almost unlimited number of weak classifiers. After all, they merely need to perform only incrementally better than chance. So, any improvement at all over the prior probabilities will do the trick. The field of machine learning in general, and the sub-field of voting classifiers in particular, makes much ado about how to combine the weak classifiers in such a way as to arrive at something like a strong classifier. (An important but possibly overlooked subtlety deals with the difference in classifier performance on training data versus novel data, but we will not discuss that issue here.)

Now consider a managing classification decision maker, having access to the opinions of many advisors, each of which performs correctly more often than chance. It would seem intuitively plausible that such a decision maker could produce a final classification decision that takes into account and benefits from the success and failure tendencies of the individual advisors. Assume some stochastic nature to the decision processes—that is, no single advisor will with certainty produce a correct decision in every case, and the performance of the advisors can best be described statistically. There is a pleasing result of machine learning theory that the managing classifier can combine individual advisors' suggestions in a linear fashion and yet perform arbitrarily well, over a set of experiments, provided the manager can choose the experiments based on the performance of the advisors to date. The combined performance will in general be much better than the performance of even the single best advisor, and will advance towards its limiting level at exponential speed in the number of experiments. This result in essence enables creation of a strong classifier from a gaggle of weak classifiers. The performance guarantee springs from the strong classifier training algorithm called boosting (see Freund, Yoav, and Schapire, Robert, "A Decision-Theoretic Generalization of On-line Learning and an Application to Boosting", *J. Computer and System Sciences*, 55(1), 119-139).

Weak Classifiers

The weak classifier is a learning automaton that performs classification tasks better than chance. Its design and implementation can be arbitrary, provided that the performance statement is fulfilled. In this study, we experimented with both binary and continuous valued weak classifiers. The continuous valued classifiers can be made to perform better than binary classifiers using a Bayesian framework. However, their implementation cost is higher at run-time.

The binary weak classifiers are simple threshold discriminators, examining the value of a single image measurement discussed next. A binary weak classifier $h_j(I)$ formally consists of a feature $f_j$, a threshold $\theta_j$ and a parity $p_j$, with associated decision rule $$h_j(I) = \begin{cases} 1 & p_j f_j(I) < p_j \theta_j \\ 0 & \text{otherwise} \end{cases} \quad (F3)$$

(where I represents an image test window and not the entire intensity image). $f_i$ is a measurement function that extracts relevant information from the image window.

The continuous weak classifiers return floating point values that are restricted (without loss of generality) to the range [−1, 1]. A continuous weak classifier $fc_j(I)\epsilon[-1,1]$ is a measurement function that extracts relevant information from the image window. One possible implementation path consists in interpreting the output of $fc_j$ probabilistically; i.e., a value of 1 means certainty that the measurement was extracted from a window containing a face, and −1 means certainty that the measurement was extracted from a window not containing a face. Intermediate values encode lesser degrees of certainty (or even uncertainty). Once the decision is taken to encode and interpret probabilistic information in the context of continuous classifier, then it becomes natural to seek to implement the optimal Bayesian classifier in this context.

Image Features

Figure 17:
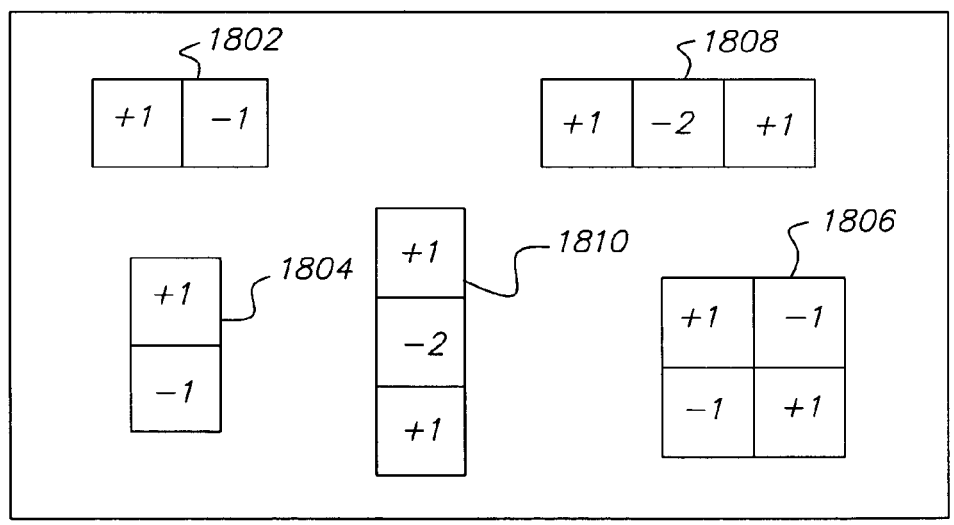
FIG. 17 is an illustration of image features used in the cascaded classifier.

The image measurements used for classification in this work are, specifically, convolution sums of the pixel image with rectangular constant filters. Furthermore, the filters consist of contiguous and equal-sized groups of two, three, or four rectangles. The groups of two and three rectangles can be aligned either horizontally or vertically. FIG. 17 illustrates the types of features in a schematic way. The intensities of the image pixels within the rectangles are multiplied by a constant coefficient and then summed. For groups of even numbers of rectangles (groups 1802, 1804, and 1806), the rectangle integrals use alternating coefficients of ±1. For the groups of three rectangles (groups 1808, and 1810), the coefficients are [1−2 1]. In all cases, the coefficients sum to zero, hence providing one vanishing moment, and therefore invariance to the first moment (average value) of the image pixels. Invariance to the second moment of the image pixels is acquired using a correction for contrast. The integral image computed from the square of the original intensity image can provide a rapid correction for local image contrast, when the correction consists of normalizing the variance of an image window. Using the fact that $\sigma_x^2 \approx \langle x^2 \rangle - \langle x \rangle^2$, and noting that means of image regions are computed with rectangular convolution sums, it can be seen that only an additional four references to the integral square image are required to compute variance-normalized convolution results. The integral image was introduced in the discussion of the Grid Pattern Classifier 1602.

The rectangles can be of any size, provided that they all fit within a nominal spatial window defined by the proportions of an average face. (The nominal window has square dimension of an exemplary of 24 pixels, with an inter-eye spacing of an exemplary of 9 pixels.) Thus, the feature size can range up to 24 pixels along single-rectangle dimensions, 12 pixels along two-rectangle dimensions, and 8 pixels along three-rectangle dimensions. The feature location can be anywhere within the nominal 24×24 pixel face window, with the restriction that the entire feature—all contiguous rectangles—must fit within the window. Hence, as feature location moves towards the lower right of the window, feature size must necessarily decrease.

Using the integral image, the value of the convolution sum over any rectangular region of the intensity image can be computed with four accesses and three additions.

Training the Cascaded Classifier

Training the cascaded classifier can be conveniently broken down into three distinct tasks: training a weak classifier, training a strong classifier, and training a new level in the cascaded classifier. On the surface, it may appear that the second and third tasks are the same. However, a special training strategy for cascaded classifier levels iteratively creates strong classifiers consisting of increasing numbers of weak classifiers until performance goals for the level are fulfilled. Hence, it really is a different task.

A large set of ~5000 face training images is used. These images consist of 56×56 pixels and 8 bit gray levels. The central part of the face region was extracted and resized to match the nominal spatial configuration. Initially, a random set of some 10,000 non-face windows feed into the training process. After the initial level of the cascaded classifier, the non-face examples are selected from false positives on scenery images of the previous levels. Successive levels in the classifier do not solve the same classification problem. Rather, each one operates in a more restrictive portion of the space of overall examples. Specifically, it operates in precisely that region of example space that was incorrectly classified as true faces by prior levels. It is this strategy for selection of classification tasks that permits the multiplicative cascading of false positive rates in (F1). In a sense, each level in the classifier solves a more "difficult" problem than the prior level. For this reason, it would seem intuitively plausible that the number of features needed to achieve comparable performance would increase rapidly as depth in the cascade increases. Indeed, this intuition is borne out in practice.

Training Algorithm

Input: True positive face set P and initial random non-face image set N; true face verification set $V_t$; initial random non-face verification set $V_f$; performance targets t,f; levels n.

```
Do for specified number of levels i=1..n
    Train strong classifier i to performance targets t,f using
        sub-algorithm IA
    Manually inspect performance curve during training of strong
        classifier I, and truncate "by eye" the number of features,
        if necessary, to achieve optimal performance/speed trade-off
    If more levels
        Reset N and V_f to be empty
        Search scenery images without faces, using cascaded classifier
            with i levels, to find windows falsely labeled as faces, and
            add to the new training set N; likewise obtain a new non-
            face verification set V_f.
End
```

Implicit in this algorithm, with its manual oversight, comes the ability (and indeed obligation) to ensure that the first few levels of the cascade use strong classifiers comprising as few weak classifiers as possible. Such careful hand tuning leads to a face detector that operates, on average, as fast as possible.

Training Algorithm IA
Input: Face image set P and non-face image set N; face verification set $V_t$ and non-face verification set $V_f$; performance targets t,f fpRate←1.0; $n_f$←1;

```
While fpRate>f do
    Use P and N to train a strong classifier with n_f weak classifiers using
        AdaBoost.
    Evaluate strong classifier on verification set V_t of true examples.
    Adjust classifier threshold h_thr upward until TP rate on V_t is no
        less than t.
    Measure fpRate on non-face verification set V_f.
End
```

Training algorithm IA uses the strategy of overruling the natural classification threshold to increase the true positive rate of the strong classifier. The nominal AdaBoost training algorithm (see Freund, Yoav, and Schapire, Robert, "A Decision-Theoretic Generalization of On-line Learning and an Application to Boosting", *J. Computer and System Sciences*, 55(1), 119-139.) gives equal weight to true negative and false positive classification errors. The threshold adjustment causes the strong classifier to greatly prefer classifying true examples correctly, at the cost of erring much more frequently on the false examples. Changing the threshold affects both the true and false positive rates.

Applying the Cascaded Classifier

Figure 21:
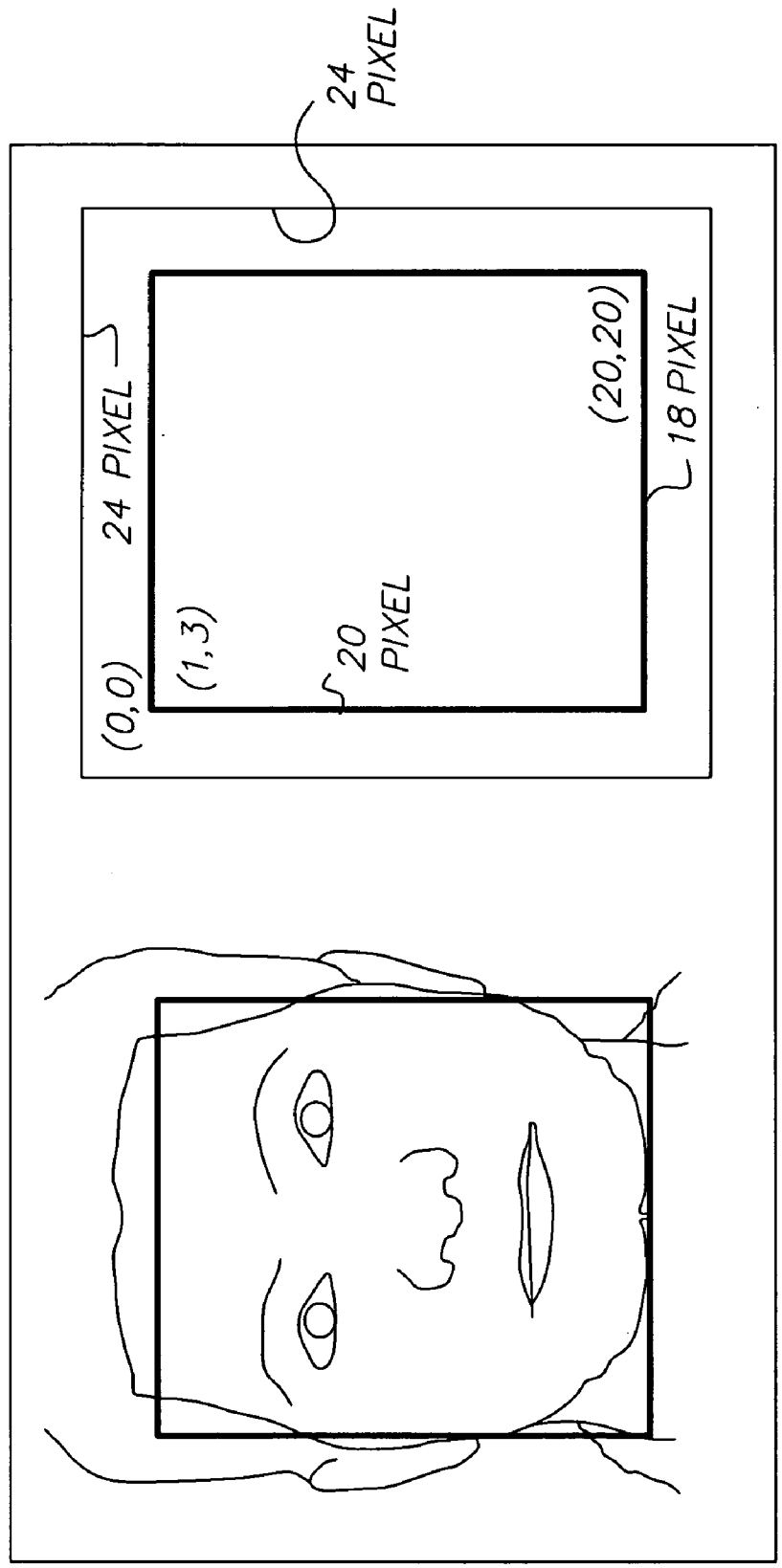
FIG. 21 is an illustration of a nominal face window.

The cascaded classifier 1604 operates on the face candidates that result from the step of post-test processing 434. Implicitly, then, the estimated scale and location of the face are provided by the grid pattern classifier 1602. The cascaded classifier training presumes a nominal face window size of 24×24 pixels, with inter-eye spacing of nine pixels, and eyes anchored at two fixed positions within the nominal window, shown in FIG. 21. Therefore, an explicit scaling and positioning step must be performed to adjust the reported face candidate into the proper nominal spatial window. This adjustment can be performed using a well-known affine transformation on the face candidate window.

At this point, before application of the cascaded classifier can profitably occur, an additional consideration must be examined. Recall that the grid pattern classifier 1602 operates using mostly low-frequency image information. By nature of the content of this information, it shows lowered sensitivity to the precise location of the image structures it seeks to locate. This evident fact springs from the integrating operation 420 of obtaining the grid pattern element image using the integral image. This operation by design causes the loss of higher frequency structure that controls exact spatial location. Similarly, since the grid cells of the grid pattern classifier can be as large as 7×7 pixels, the classifier can tolerate substantial variation in the estimated scale of the face, again due to the intentional suppression of high frequency image components.

The cascaded classifier 1604 and the Bayesian classifier 1606 both rely more predominantly on the middle- and higher-frequency image information to perform their classification tasks. Therefore, they will be highly sensitive to the accurate positioning and scale of the face within the nominal test window. A problem can therefore occur if the spatial position of the face (when a face is present) has not been accurately located by the grid pattern classifier due to its emphasis on low frequency information; or if the estimated face scale turns out to be too inaccurate. A true face might well be rejected by the later classifiers due to the inaccurate location or scale, resulting in diminished overall performance of the face detection system.

For this reason, a special search algorithm is employed in the application of the cascaded classifier 1604 to overcome the potential positioning and scale estimation imprecision of the grid pattern classifier. This search strategy involves repeated application of the cascaded classifier over a number of spatial positions and scales, seeded by the estimates of position and scale provided by the grid pattern classifier.

Figure 20:
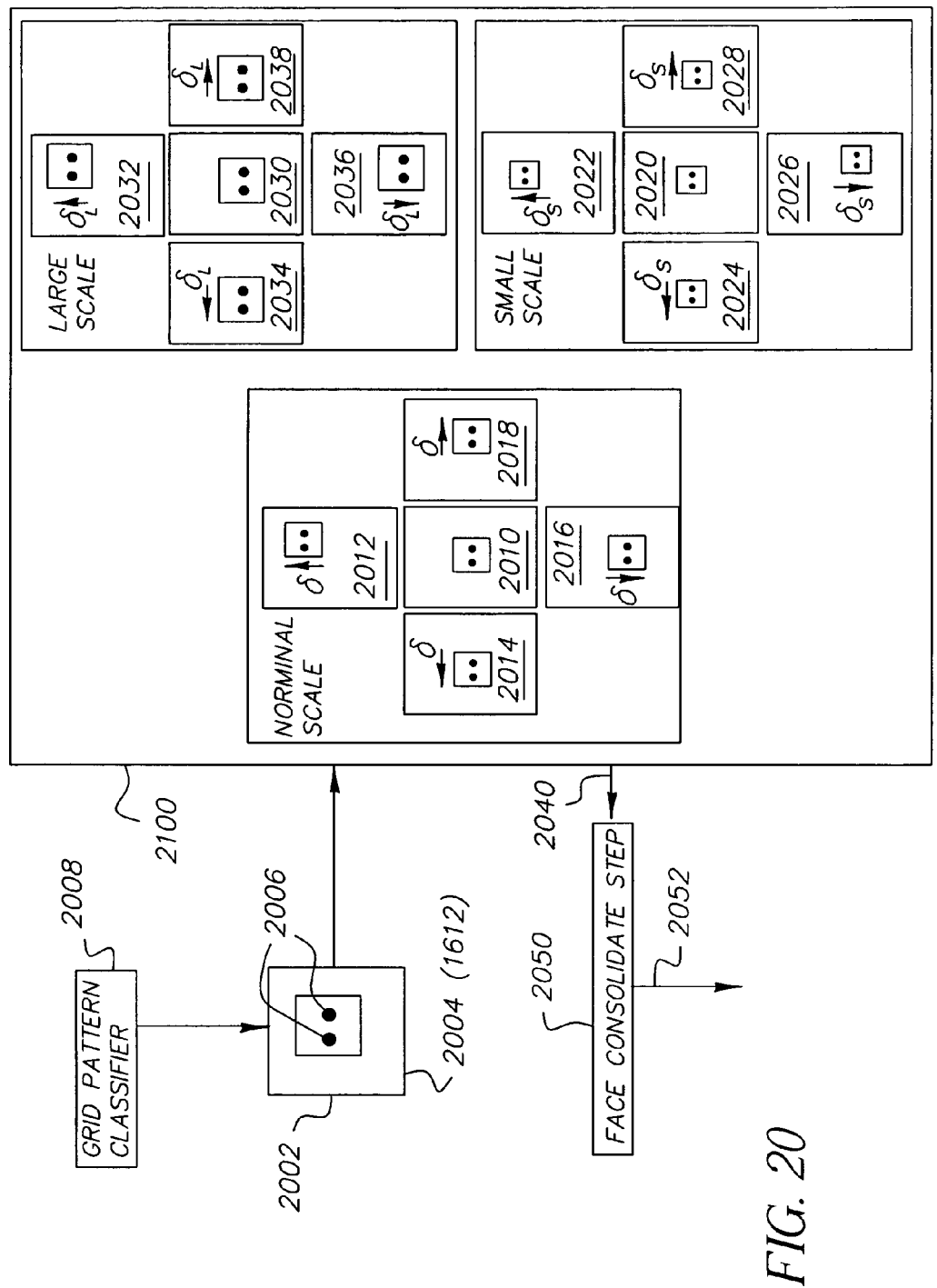
FIG. 20 is an illustration of a search strategy for a cascaded classifier.

Referring now to FIG. 20, a face candidate 2004 somewhere in an image 2002 arrives from the grid pattern classifier 2008 (also 1606), possibly with inaccuracy in estimated face location and scale (both of which are specified by the eye positions 2006). Multiple applications of the cascaded classifier 2100 are made at different scales and locations, seeded by the location and scale estimates from the grid pattern classifier. Various strategies can be employed for the search algorithm, of which a particular strategy is described here, it being understood that other location/scale strategies could be used if desired in a specific embodiment of the invention.

In the exemplary search strategy illustrated in FIG. 20, the cascaded classifier is first applied at exactly the position and scale 2010 (also 2006) estimated by the grid pattern classifier. Next, 4-neighbors of the estimated position, with step size δ (an algorithm parameter, based on estimated positional uncertainty of the grid pattern classifier, with exemplary value two pixels), and at the same scale, are examined by the cascaded classifier as shown with steps 2012, 2014, 2016, 2018. Of course, care must be exercised that these perturbed face candidate locations do not overflow the edge of the image 2002. Next, if the estimated scale is not the smallest allowed scale, the five-fold test is repeated at a smaller scale SS, starting at the same central face location, and with proportionately smaller 4-neighbor step size $δ_s = s_s * δ$, as shown with steps 2020, 2022, 2024, 2026, 2028. Finally, if the estimated scale is not the largest allowed scale, the five-fold test is repeated at a larger scale $s_l$, starting at the same central face location, and with proportionately larger 4-neighbor step size $δ_l = s_l * δ$, as shown with steps 2030, 2032, 2034, 2036, 2038.

The final result of this search strategy may be that none of the tests using the cascaded face classifier indicate face presence. In this case, the original face candidate 2004 is rejected and no further processing occurs for that candidate. Or, one or more of the tests may indicate face candidates 2040, with various locations and scales associated. In such cases, a face consolidation step 2050 must be undertaken, using the assumption that only a single face is actually present in the general location of the tests. A simple consolidation method is to select the test location and scale in which the cascaded classifier produced the highest score as the correct location and scale. Other methods are also possible, for example by weighted averaging of the locations and scales of all tests that indicated face presence, weighted by the associated classifier scores. The final output of the face consolidation step results in a single face candidate 2052 to be passed on to the Bayesian classifier 1606.

It will be remembered that a justification for the use of the distributed classifier system consists in its combination of good detection performance and high speed. Therefore, it perhaps becomes necessary to examine the speed implications of the search algorithm of FIG. 20 used in conjunction with the cascaded classifier. Since the algorithm increases the count of the tests performed by the classifier, the overall system speed can only decrease. However, it will be seen that the overall impact on system speed is quite small, since the majority of image windows will have already been rejected as non-faces by the grid pattern classifier, and will never therefore reach the cascaded classifier to result in an increase in the number of tests performed. The overall speed impact remains small. Also, the fact that the speed of the cascaded classifier may be one or two orders of magnitude greater than that of the subsequent Bayesian classifier again mitigates the penalty of the additional applications of the former.

Finally, it is noted that no equivalent search step need be performed following the cascaded classifier, before application of the Bayesian classifier. The reason is that both classifiers use the same middle- and high-frequency components of the image structure, and therefore exhibit similar accuracy profiles in their estimations of face scale and position. In other words, the Bayesian classifier will seldom err judging a face as non-face due to scale or position errors resulting from the cascaded classifier.

3. Bayesian Classifier

The Bayesian classifier 1606 performs maximum a posterior (MAP) classification using a stored probability distribution that approximates P(face|image). The method is called Bayesian because of the use of Bayes' theorem to convert the a priori measured training distribution P(image|face) into the posterior distribution in the presence of evidence from an image. The evidence consists of the pixel values in an image window. The use of Bayes' theorem is mandated by the observation that image evidence can be ambiguous. In some cases, objects and scenes not in the class of interest (i.e. non-faces, in this context) can give rise to image patterns that can be confused with class (=face) objects. Bayes' theorem requires the collection of representative non-class images, known as "world" images. The collection of world images proves to be the most difficult and critical process involved with training the algorithm. The difficulty lies in the fact that the world is very diverse. Faces are not diverse (at least when compared to the world), and so collection of training examples of faces is quite straightforward. This difficulty will be discussed at length in the section on training.

Now we proceed to introduce the critical simplifications made to the image representation that convert the Bayes classifier into a realizable system. Let us start by explicitly stating our goal, which is to arrive at simplified distributions P(face|representation) and P(non-face|representation), where the representation can be counted up and grouped during training in, say, no more than one million bins. A heuristic of training classifiers would indicate that two orders of magnitude more examples than bins are needed to meaningfully represent the true probabilities. Hence, $10^8$ examples might be required to populate $10^6$ bins in a statistically meaningful way. It is eminently possible to collect that many examples, especially if we are permitted to make up some of them, and if the "unit" of an example is something smaller than an entire human face.

Rather than making direct use of image pixels, the algorithm instead abstracts a number of image "attributes" from the image window to be tested. These attributes correspond directly in the traditional nomenclature to image "features". We will call them attributes here to maintain consistency with the original literature of Schneiderman (See Schneiderman, H., "A Statistical Approach to 3D Object Detection Applied to Faces and Cars", *Proc. CVPR* 2000). For reasons to be explained later, there are 17 different types of attributes, each measured at many spatial positions within the image window. Thus, the image representation consists of the joint occurrence of a large number of attributes.

Seventeen Attributes Used in the Bayesian Classifier

The attributes computed for the Bayesian Classifier 1606 consist of vectors of wavelet transform coefficients combined using consistent organizational rules. Each measured attribute is reduced to a single numeric value through a two-step quantization transformation. At four decomposition levels, we use coefficients from only the HL and LH wavelet bands. (HL signifies high pass horizontal, low pass vertical.) We do not use the LL or HH bands. Ignoring the LL band causes the attributes to be invariant to changes in average image illumination, due to the vanishing moment of the Haar wavelet. The attributes are not invariant to changes in scene contrast, however. Therefore, we perform explicit normalization steps to try to attain a measure of invariance to contrast, as described below.

Each attribute will be measured at all possible positions within the central face region with positional resolution related to the resolution of its wavelet supports. We can conceive of the attribute pattern following a raster scan across the image (We visualize the wavelet support over the original image for sake of understanding.) During training, the frequencies of occurrence of each attribute value at each spatial position will be learned.

Intra-band Attributes

Six of the attributes consist of groups of eight wavelet coefficients taken from single wavelet bands—2×2 HL, 2×2 LH, 4×4 HL, 4×4 LH, 8×8 HL, 8×8 LH. In each case, the grouped coefficients form a fixed geometric pattern. The choice of exactly eight coefficients is rather arbitrary, although it will set the size of the probability histograms later on. The use of groups of coefficients enables the representation of image features that are larger than the support of single wavelet filters when the coefficients are taken from one wavelet band. Spatially adjacent coefficients are selected, corresponding to spatially adjacent wavelet support regions in the original image. The attribute will be associated to the position of the upper left pixel in its support region. This type of display relates the attribute to the image region from which the attribute was measured. The attributes examine image structures of a fixed size, at different positions in the face region, at the resolution of the wavelet band. Since the source bands have either HL or LH coefficients, the different attributes will exhibit sensitivity to vertical or horizontal edge structures, respectively, at their intrinsic scale.

Inter-Frequency Attributes

Some image structures undoubtedly combine components of differing spatial scales. The attributes described until now rely on wavelet coefficients measured at a single level in the decomposition pyramid. The third category, inter-frequency attributes combines coefficients extracted from two consecutive levels in the wavelet decomposition, but at the same orientation (HL or LH). Notice in the figure that the aggregate supports of the two sets of four coefficients are anchored at the same upper left corner pixel in the image. There are six inter-frequency attributes, one each for the following combinations: 16×16, 8×8 HL; 8×8, 4×4 HL; 4×4, 2×2 HL; 16×16, 8×8 LH; 8×8, 4×4 LH; 4×4, 2×2 LH.

Combined Attribute

The $17^{th}$ attribute takes one coefficient from the matching spatial location in all eight wavelet bands—16×16, 8×8, 4×4, 2×2 HL and LH.

Quantization of Attribute Values

Since our goal is to learn and access the class-conditional probability distribution P(representation|face), the representation, in the form of attributes, must allow fetching of a probability value. All probability learning in the S2 algorithm will lead to the creation of probability histograms. To access entries in the histogram, an index is required. Therefore, a quantization transformation must operate on attribute values, resulting in a histogram index. The transformation will operate during algorithm training to populate the histograms. The same transformation will be used at testing time to reference the stored probability values.

The quantization of the vector attributes actually divides into two steps. First, scalar quantizations are applied individually to each of eight wavelet coefficients. Second, the eight quantized values are themselves vector quantized into a single number that serves as part of the histogram index.

Scalar Quantization of Wavelet Coefficients

The quantization of individual coefficients has as its goal to reduce the important variations in the appearance of image patterns in the support region of the wavelet coefficients to three discrete categories. A generic scalar quantizer consists of a set of quantization thresholds and reconstruction levels. There will be one more reconstruction level than thresholds. The number of reconstruction levels is chosen a priori, and then optimal thresholds and reconstruction levels are computed according to some criterion of goodness. A popular design algorithm that minimizes the mean square quantization error criterion of a scalar quantizer was given by Lloyd and Max (see Lim, J. *Two Dimensional Signal and Image Processing*, Prentice-Hall; New Jersey, 1990).

The use of scalar quantization of wavelet coefficients in the S2 context will not be followed by image reconstruction. Rather, the ordinal quantization values (0, 1, or 2) will serve as the digits of a radix-3 number during vector quantization. For this reason, we choose a rather special criterion for the selection of quantization thresholds. Rather than focusing on the reconstruction error, the goal will be to ensure that each quantized value occurs with equal probability. Accomplishing this goal will lead to a more uniform populating of the probability histograms during algorithm training. The process of histogram equalization readily selects thresholds resulting in uniform quantization. To perform histogram equalization, the occurrence statistics for the wavelet coefficients in each band were compiled. A representative set of images was processed by the wavelet transform. For each wavelet band, the variance of the coefficients in the band was computed. (The mean coefficient in each band will approach zero, since the wavelet high-pass filter possesses one vanishing moment.) The coefficients in each band were then coded in units of standard deviation of the band away from the band mean of zero. Finally, a histogram of the relative frequency of occurrence of each coefficient value within, say, ±3σ of the mean was computed. This histogram leads to the desired quantization thresholds by means of the histogram equalization.

Histogram equalization proceeds as following. A running sum of the occurrence histogram gives the cumulative distribution function, a monotonically non-decreasing function of increasing coefficient value. The ordinate of the cumulative distribution displays cumulative occurrence count. Two values of the ordinate are selected at, respectively, ⅓ and ⅔ of the ordinate scale, and mapped backwards through the CDF to thresholds on the abscissa. These thresholds then divide the observed training values into equal likelihood quantized ordinal values of 0, 1, and 2.

Vector Quantization of Eight Coefficients

The vector quantization step operates on the group of eight wavelet coefficients, each of which has already undergone scalar quantization in the prior step. Thus, each coefficient now stands represented by integers 0, 1, or 2. A natural and simple way now to perform the vector quantization considers the eight coefficients to be the digits of a radix-3 number. Conversion of these digits into the single radix-3 number follows the straightforward method of Horner according to $$\text{num}=c_7+3(c_6+3(c_5+3(c_4+3(c_3+3(c_2+3(c_1+3(c_0))))))))$$

where $c_7$ is the least significant digit and $c_0$ the most. There are therefore $3^8=6\,561$ possible quantized values. This fact determines one aspect of the sizing of the probability histograms.

Figure 18:
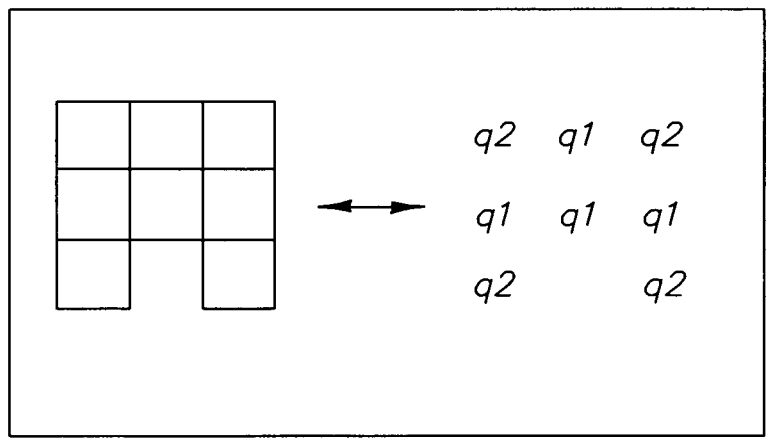
FIG. 18 is an illustration of a spatial pattern used in a Bayesian classifier.
Figure 19:
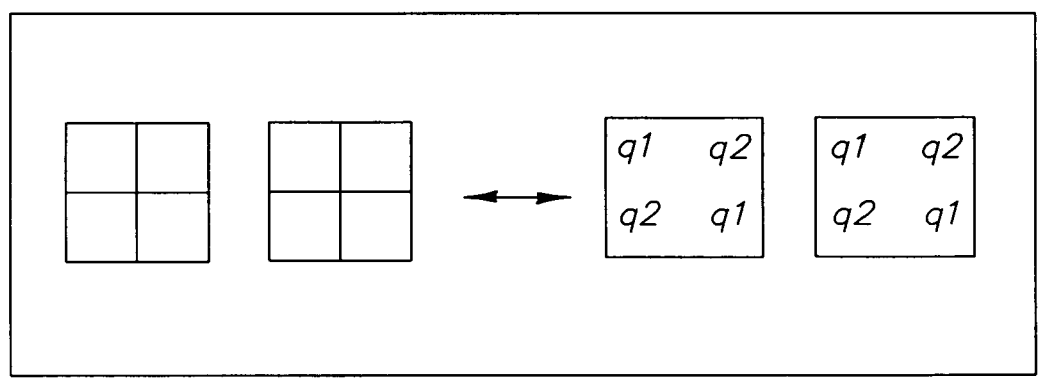
FIG. 19 is an illustration of other spatial patterns used in the Bayesian classifier.

Now let us introduce the toggled coding scheme used during the vector quantization step. All wavelet coefficients undergo scalar quantization against both sets of quantization thresholds (−q1, q1) and (−q2, q2). When it comes time to perform vector quantizations, which individual coefficient quantizations will be used, q1 or q2? The answer is that both will be used in a fixed geometric pattern related to the attribute being processed. For example, the intra-band attributes will use coefficients quantized individually according to the fixed spatial pattern shown in FIG. 18. The inter-orientation and inter-frequency attributes follow identical schemes for individual coefficient quantizations as shown in FIG. 19, while the combined attribute uses only (−q1, q1) quantization.

Access into the Probability Histogram

The single number produced by the vector quantization is combined with positional encoding to produce a full index into the probability histogram. The radix-3 number serves as the major index into the histogram. The position of the attribute's wavelet support in the face region serves as the minor index. We make use of positional information as part of the image representation because we want to associate object sub-patterns with the geometric positions in which they occur on the object. Thus, eye-like patterns are expected to have different frequencies of occurrence in the nominal eye positions compared to the cheeks, forehead, etc. The same comment applies to objects other than faces.

Image Representation

With a firm understanding of the meaning of the image attributes, we now proceed to explain how they relate to representational choices that are made to enable the learning of the class-conditional probabilities P(window|face) and P(window|non-face). Capture of these probability distributions will allow the application of Bayes' rule to perform object detection. The discussion in the following sections centers on the face-conditional probabilities, but applies equally well to non-face probabilities.

Simplifications to the image representation are applied in the order listed here and are described next.
1) standardize face region size
2) use measured attributes rather than pixels
3) ignore dependencies between attributes
4) decompose appearance and position
5) use quantized values to represent the attributes Standardize Face Region Size Spatially normalized image regions will be inspected in a window of dimensions 56×56 pixels. This simplification for x changes P(image-window|face) into $$P(56\times56\text{-pixels}|\text{face}) \tag{S1}$$

To examine various locations of the image to detect faces of differing sizes, the region of interest must be extracted and resized to a 56×56 pixel format, with pre-defined nominal eye positions.

Use Measured Attributes Rather than Pixels

Rather than making direct use of image pixels, we instead measure many attributes from the image window to be tested. For reasons explained above, there are 17 different types of attributes, each measured at multiple spatial positions within the image window. Thus, the probability distribution (S1) is replaced by $$P(\text{many-attributes}|\text{face}) \tag{S2}$$

Ignore Dependencies Between Attributes

No attempt is made to capture the statistical dependencies between attributes. This simplification limits the type of object appearances that can be modeled. For example, while a single attribute can contain sufficient representational richness to respond well to an eye, the other eye will interact with a different attribute measurement, and there can be no consideration taken of similarity or dissimilarity between the two eyes. Nor can any explicit probability encoding represent the relative levels of illumination of different parts of the face. Using this simplification, (S2) can now be replaced with $$\prod_{i=1}^{\#\ measured\text{-}attributes} P(attribute_i | \text{face}) \tag{S3}$$

Decompose Appearance and Position

At this point in the chain of simplifications of the probability distribution, (S3) is expanded to explicitly include both the measured value of an attribute and its position within the face region. Equation (S3) is replaced with $$\prod_{i=1}^{\#\ measured\text{-}attributes} P(attribute_i, position_i | \text{face}) \tag{S4}$$

where each attribute is now coupled with its position within the face region. Interpretation of (S4) intuitively leads to thoughts like the following: eye-like patterns ought to occur in face regions only in the portions likely to contain eyes.

Quantize Attribute

According to the method described above, each measured attribute is quantized into a single numerical value. With this simplification, (S4) now becomes $$\prod_{i=1}^{\#\ measured\text{-}attributes} P(q\text{-}attribute_i, position_i | \text{face}) \tag{S5}$$

Full Form of Simplified Probability Distribution

The full form of the estimated likelihood of face presence in an image region (M is the total number of measured attributes):

$$P(\text{face}|\text{window}) = \frac{\prod_{i=1}^{M} P(q\text{-}attribute_i, position_i | \text{face})P(\text{face})}{\prod_{i=1}^{M} P(q\text{-}attribute_i, position_i | \text{face})P(\text{face}) + \prod_{i=1}^{M} P(q\text{-}attribute_i, position_i | \overline{\text{face}})P(\overline{\text{face}})} \tag{S6}$$

In this expression, P(face) and P($\overline{\text{face}}$) represent the prior probabilities that an image region either does or does not contain a face. An expression analogous to (S6) holds for P($\overline{\text{face}}$|window) after exchanging face and $\overline{\text{face}}$. In the context of object detection, we are not interested in absolute probability values. We rather prefer to make maximum a posteriori (MAP) decisions about whether or not an image window contains a face. To make the decision, we compute both P(face|window) and P($\overline{\text{face}}$|window), and decide for the higher probability. Since the denominator is positive, and the same in both expressions, it can be omitted. It is common practice in two-class decisions such as this to compute instead the log-ratio of the probabilities $$\log\left[\frac{P(\text{face}|\text{window})}{P(\overline{\text{face}}|\text{window})}\right] = \log\left[\frac{\prod_{i=1}^{M} P(q\text{-}attribute_i, position_i | \text{face})P(\text{face})}{\prod_{i=1}^{M} P(q\text{-}attribute_i, position_i | \overline{\text{face}})P(\overline{\text{face}})}\right] \tag{S7}$$

and then decide face or non-face based on a threshold of zero (signifying equal probabilities). Since the prior probabilities P(face) and P($\overline{\text{face}}$) are unknown but constant, they can in principal be merged into a threshold that is chosen empirically by running the detector on a verification set of images containing labeled examples of both classes. The threshold $t_{face}$ is chosen to provide the best trade-off between true detection and false positive rates, leading to the following detection rule:

$$\log\left[\frac{\prod_{i=1}^{M} P(q-attribute_i, position_i \mid \text{face})}{\prod_{i=1}^{M} P(q-attribute_i, position_i \mid \overline{\text{face}})}\right] > t_{face} \Rightarrow \text{face} \quad (S8)$$

Note that $$\log\left[\frac{\prod_{i=1}^{M} P(q-attribute_i, position_i \mid \text{face})}{\prod_{i=1}^{M} P(q-attribute_i, position_i \mid \overline{\text{face}})}\right] = \quad (S9)$$

$$\sum_{i=1}^{M} \log\left[\frac{P(q-attribute_i, position_i \mid \text{face})}{P(q-attribute_i, position_i \mid \overline{\text{face}})}\right]$$

To implement decision rule (S8), the S2 probability histograms store the summand on the right hand side of (S9) for each quantized attribute/position combination. Computation of (S9) then simply requires summation of values fetched from the histograms.

Training

Step 1: Compute Wavelet Band Statistics

About 1750 windows of a standard size were extracted randomly from consumer photographic images. Each example window was then used in all four 90° orientations, to ensure isotropic presentation of image structures. Four levels of wavelet decomposition were computed for each image, and statistics of the coefficients in the HL and LH bands were compiled. The resulting standard deviations of wavelet coefficients were [10.2, 21.8, 48.1, 108.7] for square support sizes 2, 4, 8, 16 respectively. By design, there was no difference between HL and LH coefficients statistically. The deviation in increase of σ from the expected value of two at each level (due to the wavelet filter gain) can be explained by the inherent scale of real-world object structures in these images as related to the resolution imposed by a standardized digitization.

Step 2: Gather Wavelet Coefficient Histograms

A set of several thousand images of faces served as data for this step. Four levels of wavelet decomposition were computed for each image, followed by conversion of coefficients in HL and LH bands into units of the respective bands' standard deviation (from step 1). One file per band was written, containing the occurrence histograms of the coefficients in the band.

Step 3: Determine Quantization Thresholds

A notebook in Mathematica™ read the coefficient histograms from step 2 and computed (−q1, q1) and (−q2, q2) quantization thresholds.

Step 4: Populate Attribute Probability Histograms

Using a very large set of face training images, the occurrences of quantized attribute values, at each position in the nominal face region, were observed and counted. The training set contained 7 296 faces, each perturbed 30 times with slight modifications, and all five γ corrections were used, resulting in a total of about one million face examples. For non-faces, an initial random set of examples starts the process of filling the non-face histograms.

Step 5: Bootstrap Search for False Examples

This step comprises the most lengthy and critical part of the training process. Running in fully automated fashion, the following actions are repeated as long as desired.

Step 5A: Given the current state of training, and a desired true detection rate (e.g. 99%), compute detector responses on a verification set of about 600 true and false examples. Set a detection threshold yielding the desired detection rate.

Step 5B: Search scenery images without faces with the detector. Any windows marked as faces are false positive errors. Treat these windows as if they were the non-face examples in step 4. Incrementally update the non-face attribute probability histograms with the quantized attribute/positional occurrences in these examples.

Step 5C: After every n scenery images (n selected by the user), write updated attribute probability histograms to files. Perform the Lloyd-Max scalar quantization on the histograms to also write the quantized versions.

Description of Face Verification

Here is a pseudo-code description of the steps taken to verify faces for face candidate windows from the Cascaded Classifier 1604.

---

For base scales $1, 2^{\frac{1}{3}}, 2^{\frac{2}{3}}$ (geometric series)

```
Resize windows (if necessary) to the scale
Perform seven level wavelet decomposition
For four octaves of magnification
    Quantize all wavelet coefficients against q1 and q2
thresholds, all gamma corrections; using appropriate four
consecutive levels of the wavelet transform
    For all 17 attributes
        Compute radix-3 (position independent) vector quantization
at all pixel positions
        For all rows and columns (allow adjustable window step size)
            Sum probability ratio eq. (S8) within nominal face region
            If probability ratio > detection threshold
                Mark a face at this location and scale
    End for
End for
Combine verified faces that overlap in position and across scales
```

---

The above discussion provides detailed description of the distributed classifier system of the present invention. Notice that the whole system covers both low frequency and high frequency information in the process of extracting image features. The grid pattern classifier basically uses information at the lower end of the frequency spectrum, while the cascaded and the Bayesian classifiers use the higher end information. Therefore, this distributed system fully explores discriminative features for face and non-face in the frequency domain, which may help to improve overall detection accuracy (reduce false positives). In this sense, the grid pattern classifier and the cascaded and Bayesian classifiers are complementary to each other in the frequency domain. Moreover, the grid pattern classifier and the cascaded and Bayesian classifiers are complementary to each other in terms of execution speed and detection accuracy as well.

Also notice that the grid pattern classifier plays a critical role in providing the subsequent classifiers with a set of face candidate windows that contain most of the true faces and a minimum number of non-faces, so that the whole system can achieve high execution speed and high detection rate. Therefore, as discussed in the background of the invention adjustments of the operation of the grid pattern classifier are needed to accommodate variations presented in images. These adjustments are realized through using the controllable parameters generated from step 1402 in the grid pattern classifier.

Now define the earlier-described parameters used in the chromaticity test 202 of the grid pattern classifier 1602 as $\mathfrak{R}=[R_{MIN}^{G}, R_{MAX}^{G}, R_{MIN}^{B}, R_{MAX}^{B}, R_{T}, G_{T}, B_{T}, D_{GB}]$. Define the earlier-described parameters used in the geometry test 204 of the grid pattern classifier 1602 as $\Gamma=[T_{W}, T_{H}, T_{A}, T_{S}]$. Define the earlier-described parameters used in the grid pattern test 206 of the grid pattern classifier 1602 as $\Psi=[r_{T}, S_{Min}, S_{Max}]$.

Referring to FIG. 2A, the system 1400 always starts off by loading up the constant parameter generator 1404 with the predefined exemplary values (as shown in earlier parts of this disclosure for the parameters listed in the previous paragraph) for $\mathfrak{R}$, $\Gamma$ and $\Psi$. A human operator 1418 uses the mouse 108 or keyboard 106 (FIG. 1) to command the system to select the constant parameters through the steps of human intervention 1412 and parameter selection 1408. A feedback 1414 from the distributed classifier system 1410 provides useful information to the human intervention step 1412 (e.g., by displaying of an intermediate result 1414 on the monitor 104) for seeking either staying on the current course or calling for a change of the operation. The human operator can halt the operation through human intervention 1412 and adjust corresponding parameters $\mathfrak{R}$, $\Gamma$ and $\Psi$ (this action is represented by the step of using the controllable parameter generator 1402). Then the human operator 1418 uses the mouse 108 or keyboard 106 to command the system to select the controllable parameters through the steps of human intervention 1412 and parameter selection 1408.

One exemplary scenario is that the face detection system is given a large quantity of images taken in a narrow spectrum lighting condition. Using the predefined parameters (from the constant parameter generator 1404), the chromaticity test 202 produces less than satisfied results that lead to a low face detection rate. Upon inspecting a first couple of results, the human operator halts the process; adjusts parameters, for example, $R_{MIN}^{G}$, $R_{MAX}^{G}$, $R_{MIN}^{B}$, $R_{MAX}^{B}$ of $\mathfrak{R}$ so that after switching to using the controllable parameters, the chromaticity test 202 retains most of the skin pixels illuminated by the narrow spectrum lighting. The system can resume its processing of this set of images.

Another exemplary scenario is that the face detection system is given a set of images with faces having approximately a same size. Recall that in the grid pattern test 206 the search of faces starts with a maximum possible cell size $S_{Max}$ (see a step of starting from an adequate grid pattern cell size 418) all the way down to a minimum allowable cell size $S_{Min}$ (see a step of query 2 (428)). In this scenario, there is no need of conducting a face search with many different cell sizes. Entering adequate values for $S_{Max}$ and $S_{Min}$ makes the system run more efficiently, therefore reduces processing time and cost.

It is understood that the other two classifiers in the present invention can use the parameter selection mechanism as well.

It is also understood that the concept of parameter selection of the present invention is applicable to other practical object detection systems.

The subject matter of the present invention relates to digital image understanding technology, which is understood to mean technology that digitally processes a digital image to recognize and thereby assign useful meaning to human understandable objects, attributes or conditions, and then to utilize the results obtained in the further processing of the digital image.

The invention has been described with reference to a preferred embodiment. However, it will be appreciated that variations and modifications can be effected by a person of ordinary skill in the art without departing from the scope of the invention.

Parts List 100 image source
102 image processor
104 image display
106 data and command entry device
107 computer readable storage medium
108 data and command control device
109 output device
202 chromaticity test
204 geometry test
206 confidence test
208 location test
210 post-test processing
212 mean grid pattern element image generator
304 collecting sample face images
306 getting a mean face image
308 determining individual cells covering local facial features
310 determining a region containing all cells
312 roping a sub-image from the mean face image using the determined region position and size
314 determining four corner positions for all cells in the cropped box
316 generating an integral image with cropped sub-image
318 computing a mean grid pattern image using cell corner positions in the integral image
320 generating a mean grid pattern element image
372 collecting sample face images
372 getting a mean face image
376 computing a distance, $e_1$, between two eye centers
378 computing a center position, c, between two eye centers
380 using c and $e_1$ to define a region containing M×N cells each of which has m×n pixels
382 cropping a sub-image from the mean face image using the determined region position and size
384 determining four corner positions of all cells in the cropped sub-image
386 generating an integral image with the cropped sub-image
388 computing a mean grid pattern image using cell corner positions in the integral image
390 generating a mean grid pattern element image
402 resizing image down
404 erasing non-skin-color pixels
406 clustering remaining pixels into clusters
408 morphological process
410 erasing unwanted clusters
411 converting to gray image
412 forming a parameters sets list
414 cropping a sub-image using a set of parameters
416 computing an integral image using the sub-image
418 starting from an adequate grid pattern cell size
420 scanning the current sub-image and obtain grid pattern element images using the integral image
422 grid pattern test using mean grid pattern element image
424 condition check
426 query 1
428 query 2
430 query 3
432 location test
434 post-test processing
502 face image
504 corner 506 cell
508 cluster boundary
602 face image
608 distance
702 face image
704 distance
706 center position
708 distance
710 distance
712 distance
802 face intensity image
804 face M×N grid pattern image
806 grid cell
902 chart
904 distribution curve
906 distribution curve
908 threshold
1002 chart
1004 curve
1006 number
1102 face image
1104 region
1106 corner position
1108 corner position
1110 corner position
1112 corner position
1114 corner position
1116 cell
1120 pixel
1122 integral image
1126 position
1128 position
1130 position
1132 position
1134 position
1202 intensity image
1212 first binary image
1216 cluster R1
1218 cluster R2
1220 cluster R3
1232 second binary image
1234 cluster R11
1236 cluster R12
1238 cluster R2
1240 cluster R4
1242 third binary image
1244 cluster R3
1246 cluster R12
1248 box
1302 fourth binary image
1304 box W2
1306 box W1
1308 box W3
1310 cluster R3
1400 Face detection system
1402 Controllable Parameters Generator
1404 Constant Parameters Generator
1406 Image
1408 Parameter Selection
1410 Distributed classification System
1412 Human Intervention
1414 line
1416 line
1418 operator
1424 line
1426 line
1502 classifier I
1504 classifier II
1506 classifier N
1602 grid pattern classifier
1604 cascaded classifier
1606 Bayesian classifier
1612 face candidate
1702 discriminant 1
1704 discriminant 2
1706 discriminant n
1802 horizontal two rectangle feature
1804 vertical two rectangle feature
1806 four rectangle feature
1808 horizontal three rectangle feature
1810 vertical three rectangle feature
2002 image
2004 face candidate
2006 eye positions
2008 grid pattern classifier
2010 estimated nominal scale application
2012 first neighbor to estimated nominal scale
2014 second neighbor to estimated nominal scale
2016 third neighbor to estimated nominal scale
2018 fourth neighbor to estimated nominal scale
2020 estimated smaller scale application
2022 first neighbor to estimated smaller scale
2024 second neighbor to estimated smaller scale
2026 third neighbor to estimated smaller scale
2028 fourth neighbor to estimated smaller scale
2030 estimated larger scale application
2032 first neighbor to estimated larger scale
2034 second neighbor to estimated larger scale
2036 third neighbor to estimated larger scale
2038 fourth neighbor to estimated larger scale
2040 face candidate
2050 face consolidate step
2052 face candidate
2100 cascaded classifier

What is claimed is:

1. A digital image processing method for detecting faces in a digital color image, said method comprising the steps of:
providing a distributed face detection system having N complementary classifiers, wherein the classifiers are complementary in a frequency domain;
selecting classifier parameters for the complementary classifiers from a plurality of different parameter generating sources, at least one of which is controllable by human input;
reconfiguring the complementary classifiers in the distributed face detection system according to the selected classifier parameters, such that any desired combination of only M of the N complementary classifiers are involved in face detection, wherein M and N are integers, M is less than N, and M is greater than zero; and
detecting faces using the M complementary classifiers in the distributed face detection system;
wherein the step of providing a distributed face detection system having complementary classifiers comprises the steps of: constructing one or more classifiers having high execution speed and featuring operation in one portion of the frequency spectrum of the digital image, and constructing one or more classifiers having high accuracy and featuring operation in another portion of the frequency spectrum of the digital image; and
wherein the step of constructing one or more classifiers having high accuracy and featuring operation in another portion of the frequency spectrum of the digital image comprises steps of: constructing a cascaded classifier, and constructing a Bayesian classifier.

2. The method as claimed in claim 1 wherein the step of constructing one or more classifiers having high execution speed and featuring operation in one portion of the frequency spectrum of the digital image comprises the step of constructing a grid pattern classifier.

3. A digital image processing method for detecting faces in a digital color image, said method comprising the steps of:
   providing a distributed face detection system having N complementary classifiers, wherein the classifiers are complementary in a frequency domain;
   selecting classifier parameters for the complementary classifiers from a plurality of different parameter generating sources, at least one of which is controllable by human input;
   reconfiguring the complementary classifiers in the distributed face detection system according to the selected classifier parameters, such that only M of the N complementary classifiers are involved in face detection, wherein M and N are integers, M is less than N, and M is greater than zero; and
   detecting faces using the M complementary classifiers in the distributed face detection system,
   wherein the step of providing a distributed face detection system having complementary classifiers comprises the steps of:
   constructing one or more classifiers having high execution speed and featuring operation in one portion of the frequency spectrum of the digital image; and
   constructing one or more classifiers having high accuracy and featuring operation in another portion of the frequency spectrum of the digital image,
   wherein the step of constructing one or more classifiers having high execution speed and featuring operation in one portion of the frequency spectrum of the digital image comprises the step of constructing a grid pattern classifier, and
   wherein the step of constructing a grid pattern classifier comprises the steps of:
   generating a mean grid pattern element (MGPe) image from a plurality of sample face images;
   generating an integral image from the digital color image;
   locating faces in the digital color image by using the integral image to perform a correlation test between the mean grid pattern element (MGPe) image and the digital color image at a plurality of effective resolutions by reducing the digital color image to a plurality of grid pattern element images (GPes) at different effective resolutions and correlating the MGPe with the GPes.

4. The method as claimed in claim 3 wherein the step of generating a mean grid pattern element (MGPe) image comprises the steps of:
   collecting sample face images;
   generating a mean face image from the sample face images;
   selecting a grid pattern (GP); and
   reducing the resolution of the mean face image to the resolution of the selected grid pattern (GP) by averaging.

5. The method as claimed in claim 4 wherein the grid pattern is regular.

6. The method as claimed in claim 4 wherein the grid pattern is irregular.

7. The method as claimed in claim 6 wherein the step of selecting an irregular grid pattern comprises determining a plurality of different size grid cells that cover major features including eyes, nose, mouth, forehead, and cheek of the mean face image.

8. The method as claimed in claim 5 wherein the step of selecting a regular grid pattern comprises computing a distance $e_1$ between two eye centers of the mean face image; computing a center position c between two eye centers; using $e_1$ and c to determine a region that contains M by N grid cells with each cell having m by n pixels.

9. A digital image processing method for detecting faces in a digital color image, said method comprising the steps of:
   providing a distributed face detection system having complementary classifiers, wherein the classifiers are complementary in a frequency domain;
   selecting classifier parameters for the complementary classifiers from a plurality of different parameter generating sources, at least one of which is controllable by human input;
   reconfiguring the complementary classifiers in the distributed face detection system according to the selected classifier parameters; and
   detecting faces using the distributed face detection system,
   wherein the step of providing a distributed face detection system having complementary classifiers comprises the steps of:
   constructing one or more classifiers having high execution speed and featuring operation in one portion of the frequency spectrum of the digital image; and
   constructing one or more classifiers having high accuracy and featuring operation in another portion of the frequency spectrum of the digital image,
   wherein the step of constructing one or more classifiers having high execution speed and featuring operation in one portion of the frequency spectrum of the digital image comprises the step of constructing a grid pattern classifier, and
   wherein the step of generating an integral image further comprises the steps of:
   replacing non-skin-color pixels with black to produce an image C having skin color pixels;
   replacing non-face-shaped clusters with black to produce an image E having skin colored face shaped clusters;
   labeling clusters of skin colored face shaped clusters; and
   generating the integral image from each cluster of the image E.

10. The method claimed in claim 9 further comprising the steps of:
    eliminating faces that contain more than a predetermined percentage of black pixels; and
    merging faces that substantially overlap.

11. The method claimed in claim 9 wherein the step of replacing non-face-shaped clusters comprises the steps of:
    clustering skin-color pixels in image C into clusters;
    applying a morphological opening and closing processes to skin-colored pixel clusters; and
    replacing the pixels of a cluster with black if it does not meet a geometrical criterion for a face, resulting in an image E, and wherein the step of labeling skin-colored clusters comprises the step of generating a linked list of sets of parameters including a starting position, width, and height that defines regions containing a cluster of skin-colored pixels.

12. The method as claimed in claim 1 wherein the step of selecting classifier parameters for the complementary classifiers from a plurality of different parameter generating sources comprises the steps of:
   providing a constant parameter generator; and
   providing a controllable parameter generator.

13. The method as claimed in claim 1 wherein the step of reconfiguring the complementary classifiers in the distributed face detection system according to the selected classifier parameters comprises the steps of:
   providing commands to individual classifiers; and
   directing the input digital image to different classifiers in accordance with the commands.

14. A computer readable storage medium having instructions stored therein for causing a computer to perform the method of claim 1.

15. A digital image processing method for detecting faces in a digital color image, said method comprising the steps of:
   providing a distributed face detection system having N complementary classifiers, wherein the classifiers are complementary in a frequency domain and comprise one or more classifiers having high execution speed and featuring operation in one portion of the frequency spectrum of the digital image, and one or more classifiers having high accuracy and featuring operation in another portion of the frequency spectrum of the digital image;
   providing classifier parameters for the complementary classifiers from a plurality of different parameter generating sources dependent upon conditions of he digital image; and
   detecting faces using any desired combination of only M of the N complementary classifiers in the distributed face detection system, wherein M and N are integers, M is less than N, and M is greater than zero;
   wherein the one or more classifiers having high accuracy and featuring operation in another portion of the frequency spectrum of the digital image are provided by: constructing a cascaded classifier, and constructing a Bayesian classifier.

16. The method as claimed in claim 15 wherein the one or more classifiers having high execution speed and featuring operation in one portion of the frequency spectrum of the digital image are provided by constructing a grid pattern classifier.

17. The method as claimed in claim 15 wherein the step of providing classifier parameters for the complementary classifiers from a plurality of different parameter generating sources comprises the steps of:
   providing a constant parameter generator; and
   providing a controllable parameter generator.

18. A computer readable storage medium having instructions stored therein for causing a computer to perform the method of claim 15.

19. A digital image processing system for detecting faces in a digital color image, said system comprising:
   a distributed face detection system having N complementary classifiers, wherein the classifiers are complementary in a frequency domain;
   a plurality of different parameter generating sources for selecting classifier parameters for the complementary classifiers, wherein at least one of the sources is controllable by human input; and
   means for reconfiguring the complementary classifiers in the distributed face detection system according to the selected classifier parameters, such that any desired combination of only M of the N complementary classifiers are involved in face detection, wherein M and N are integers, M is less than N, and M is greater than zero;
   wherein the complementary classifiers include one or more classifiers having high execution speed and featuring operation in one portion of the frequency spectrum of the digital image, and classifiers having high accuracy and featuring operation in another portion of the frequency spectrum of the digital image; and
   wherein the classifiers having high accuracy and featuring operation in another portion of the frequency spectrum of the digital image include a cascaded classifier and a Bayesian classifier.

20. The system as claimed in claim 19 wherein the one or more classifiers having high execution speed and featuring operation in one portion of the frequency spectrum of the digital image comprise a grid pattern classifier.

* * * * *

UNITED STATES PATENT AND TRADEMARK OFFICE
CERTIFICATE OF CORRECTION

| | |
|---|---|
| PATENT NO. | : 7,508,961 B2 |
| APPLICATION NO. | : 10/387079 |
| DATED | : March 24, 2009 |
| INVENTOR(S) | : Shoupu Chen et al. |

Page 1 of 1

It is certified that error appears in the above-identified patent and that said Letters Patent is hereby corrected as shown below:

| Issued Patent Column | Line | Description of Error |
|---|---|---|
| First Page Column 2 (Other Publications) | 3 | Delete "Imgaes:" and insert -- Images: --, therefor. |
| 35 | 30 | In Claim 15, delete "he" and insert -- the --, therefor. |

Signed and Sealed this

Second Day of February, 2010

David J. Kappos
*Director of the United States Patent and Trademark Office*